(12) United States Patent
Maynard

(10) Patent No.: US 12,019,361 B2
(45) Date of Patent: *Jun. 25, 2024

(54) IMMERSIVE OPTICAL PROJECTION SYSTEM

(71) Applicant: Passenger Inc., Austin, TX (US)

(72) Inventor: Ronald S. Maynard, Austin, TX (US)

(73) Assignee: Passenger Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,807

(22) Filed: Jun. 23, 2021

(65) Prior Publication Data

US 2021/0318603 A1    Oct. 14, 2021

Related U.S. Application Data

(63) Continuation of application No. 16/653,987, filed on Oct. 15, 2019, now Pat. No. 11,073,752, which is a (Continued)

(51) Int. Cl.
*G03B 21/28* (2006.01)
*G02B 5/12* (2006.01)
(Continued)

(52) U.S. Cl.
CPC ............ *G03B 21/28* (2013.01); *G02B 5/12* (2013.01); *G02B 26/12* (2013.01); (Continued)

(58) Field of Classification Search
CPC .... G03B 21/005; G03B 21/008; G03B 21/28; G03B 21/145; G03B 21/2013; G03B 21/2033; G02B 26/0825; G02B 26/0841; G02B 26/10; G02B 26/12; G02B 26/101; G02B 26/103; G02B 26/105;
(Continued)

(56) References Cited

U.S. PATENT DOCUMENTS

| 11,112,613 B2* | 9/2021 | Lanman | G02B 27/0179 |
| 2010/0026960 A1* | 2/2010 | Sprague | H04N 9/3129 |
| | | | 353/28 |

(Continued)

*Primary Examiner* — Sultan Chowdhury

(57) ABSTRACT

A virtual and augmented reality system comprising an immersive sound system, sensors, a power source, communications, data processing, and an optical system that delivers photoreceptor density resolution, wide angle, high contrast, binocular vision, continuous depth of field images, is integrated for a fully immersive experience. In one embodiment, an optical system comprises a miniaturized array of projectors geometrically arranged to cover retina photoreceptive areas. Projectors provide full spectrum, amplitude modulated, and controllably divergent beams of light that can be steered with one or more degrees of freedom. Segmented projector arrays greatly improve dynamic performance. An adaptive optics reflector includes an array of fixed, or independently controllable optical elements, that can alter reflected beam properties such that a virtual object may appear to be nearer or further from the viewer. A direct projection, two dimensional array of micro projectors are positioned to deliver a fully immersive image directly into the eye.

20 Claims, 25 Drawing Sheets

Related U.S. Application Data continuation of application No. 15/716,503, filed on Sep. 26, 2017, now Pat. No. 10,481,479.

(60) Provisional application No. 62/399,530, filed on Sep. 26, 2016.

(51) Int. Cl.

| | | |
|---|---|---|
| *G02B 26/12* | (2006.01) | |
| *G02B 27/00* | (2006.01) | |
| *G02B 27/01* | (2006.01) | |
| *G06F 3/01* | (2006.01) | |
| *H04N 9/31* | (2006.01) | |
| *H04R 1/02* | (2006.01) | |
| *G02B 1/00* | (2006.01) | |
| *G02B 26/08* | (2006.01) | |

(52) U.S. Cl.
CPC ..... *G02B 27/0037* (2013.01); *G02B 27/0172* (2013.01); *G02B 27/0176* (2013.01); *G06F 3/013* (2013.01); *H04N 9/3129* (2013.01); *H04N 9/3147* (2013.01); *H04R 1/025* (2013.01); *G02B 1/002* (2013.01); *G02B 26/0825* (2013.01); *G02B 26/0841* (2013.01); *G02B 2027/0178* (2013.01); *G02B 2027/0187* (2013.01)

(58) Field of Classification Search
CPC .... G02B 26/106; G02B 27/01; G02B 27/017; G02B 27/0037; G02B 27/0101; G02B 27/0172; G02B 27/0176; G02B 5/09; G02B 5/10; G02B 5/12; G02B 5/124; G06F 3/011; G06F 3/012; G06F 3/013; G06F 3/014; H04N 9/3129; H04N 9/3141; H04N 9/3147; H04N 9/3152; H04N 9/3155; H04N 9/3158
See application file for complete search history.

(56) References Cited

U.S. PATENT DOCUMENTS

| | | | |
|---|---|---|---|
| 2016/0091722 A1* | 3/2016 | Liu | H04N 23/11 345/8 |
| 2017/0235429 A1* | 8/2017 | Viswanathan | G02B 27/141 345/175 |
| 2017/0285343 A1* | 10/2017 | Belenkii | H04N 13/344 |
| 2021/0294106 A1* | 9/2021 | Meitav | H04N 9/31 |

\* cited by examiner

IMMERSIVE OPTICAL PROJECTION SYSTEM

CROSS-REFERENCE TO RELATED APPLICATIONS

This application claims the benefit of provisional patent application Ser. No. 62/399,530, filed 2016 Sep. 26 by the present inventor.

BACKGROUND

Field

The present disclosure relates to a virtual reality system that provides a photoreceptor density limiting, wide angle, full spectrum, binocular vision, real optical depth of field, imaging system in a head mounted form factor.

Many devices have been created to deliver optical information to the human eye. Visual information can take the form of high definition video, computer generated content, two and three dimensional content, text, etc. The visual component of a virtual reality system delivers synthetic content directly to the eye, whereas augmented reality systems blend generated content with a real world views.

In nature, every illuminated particle reflects or emits rays of light in every direction and in a multitude of wavelengths. The rays that reach us from afar are nearly parallel and those that arrive from a nearby point are more divergent. The arriving beams that pass through our pupils are focused, or made more convergent, as they pass through the cornea, the aqueous humor, the crystalline lens, the vitreous humor and finally, the retina.

For normal vision, an image will be formed on a portion of the retina that is dependent on the entrance angle of the beam with respect to the optical axis of the eye, or direction of gaze. Those images that form in the central 2 degrees of vision fall on an area of the retina with an exceptionally high density of photoreceptor cells called the fovea. It is here that most of the high resolution visual information is converted from optical to electrical nerve impulses via the photoreceptors, and transmitted to the visual cortex via the optic nerve bundle. Photoreceptors further away from the fovea detect off axis images and contribute to the sense of peripheral vision. In total, there are approximately 15 million rod cell and cone cell photoreceptors. Rod cells detect low levels of light, but no color, and cone cells detect color, but only at higher levels of light intensity. Three types of cone cells sensitive to red green and blue light, are predominantly found in the high density central area of the retina, thereby providing high resolution color vision.

Because central vision contains so much more information, the eye will rapidly "scan" or saccade on one important target, say a face or moving object, and jump to another at a rate of up to 1000 Hz. The eye will also "jitter" or micro saccade to provide continuous sensitization to the retina. The eye can rotate up/down and left/right about a central point at a speed of up to 900 degrees per minute. Although the eye can rotate in excess of 50 degrees in various directions, depending upon age, individuals rarely exhibit eye motions exceeding plus or minus 10 degrees from a straight ahead gaze.

An eye, with a fixed forward gaze, can detect light impinging on the cornea from and angle of nearly 110 degrees towards the temple, and about 59 degrees towards the nose. The field of vision also extends to approximately 56 degrees above and 70 degrees below the direction of gaze.

In addition there is the coordinated movement of the eyes with each other to provide for binocular vision and depth perception. There is coordinated movement of the eyes with respect to head position to maintain fixed targeting of a stationary object during body motion or stable targeting of a moving object. The crystalline lens can also deform via the ciliary process to increase its focusing power and bring a near object whose rays are more divergent, to a sharp focus on the retina.

Current Art

A typical movie projector produces a focused image on a curved or flat screen at a distance. A curved screen helps to improve the sense of immersion with a modest increase in peripheral vision. In both cases, the distant screen provides reflected parallel light beams that can easily be focused by the human eye, but lends little parallax or binocular information.

Viewing a distant screen with "3D" glasses can provide a sense of depth. These devices utilize various techniques to deliver a slightly different view angle to each eye. Most are limited by frame rate, brightness, and the production of a truly divergent ray field that a near object would produce. And of course, they are all subject to the flat field, limited resolution, limited dynamic range and limited angular extent of the distant screen. An improvement in field of view occurs when moving a screen closer while using 3D glasses. Although closer, the depth of focus remains constant and relaxed distant focus is lost. The field of view is also only a small subset of the visual potential.

Additional information content can be added by a "heads up" display whereby information is projected on the surface of a visor or screen. Using a combination of scanners and optical elements, a virtual image can be produced at any depth, but is usually limed in scope. Such information may overlay the true visual field. The overlay of a computer generated, or other video source on a true direct view of a scene falls in the realm of augmented reality.

Finally, virtual reality goggles, or machine augmented reality attempts to provide all the visual clues, including opposing head/eye motions, and binocular vision, to give a sense of total immersion. Most provide a modestly wide field of binocular view, but are limited in true divergent fields that would be produced by near objects. They are also limited by the inability to accurately synchronize head motions with the simulated visual field. They also suffer from sensory conflicts between the human vestibular system and the projected visual field, resulting in 3D motion sickness. And without the knowledge of where the direction of gaze is located, the total information bandwidth must be spread evenly over the field of vision, thereby wasting it on low acuity peripheral vision.

SUMMARY

What is needed then is a visual, total immersion device that can provide optical stimulation to each of the 15 million rod and cone cells of the retina in a way that accurately simulates depth perception, a binocular parallax, a large color space, a maximum field of view, and does not compromise the motion sensory functions of the vestibular system. And from a standpoint of practicality, it must be relatively inexpensive to manufacture, robust, and have the ability to selectively deliver maximum resolution and bandwidth to the central field of view.

DETAILED DESCRIPTION

Figure 1:
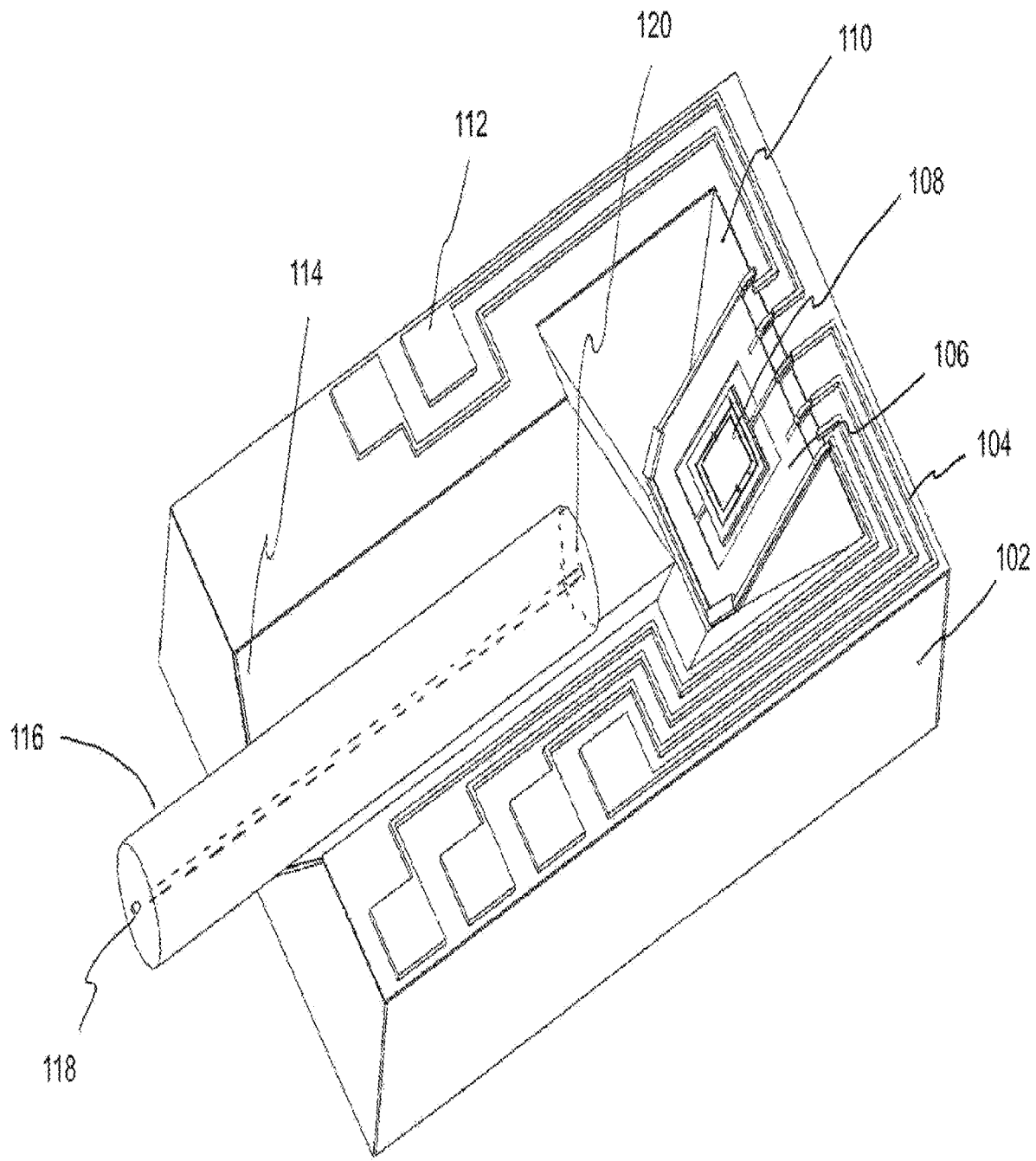
FIG. 1—Monolithically Micromachined Beam Steering Device
FIG. 3—Two Degree of Freedom Optical Scanner with Divergent Micro Lens
FIGS. 4, 5, 6—Variable Focus Optical Element
FIG. 7—Quad Array of Optical Scanners
FIGS. 8 and 9—Wide Angle Scanning Array Projector
FIG. 10—Reflector Scanner Imaging System
FIG. 11—Eye Tracker
FIG. 12—Sealed Optics
FIG. 13—Isometric 3D View of the Reflector Scanner Imaging System
FIG. 14—Imaging of Near Objects and Accommodation
FIG. 15—Creating Real Images Exhibiting a True Depth of Field from Virtual Objects
FIG. 16—Single DOF V-Gap Optical Element
FIG. 17—Close-up detail of V-Gap Optical Element Hinge Area
FIG. 18—Small Cross Section of Adaptive Optics Reflector Array
FIG. 19—Fixed Array of Variable Focus Optical Elements
FIG. 20—Steerable Variable Focus Optical Element in a Convex State
FIG. 21—Steerable Variable Focus Optical Element in a Concave State
FIG. 22—Array of Steerable Variable Focus Optical Elements in a Concave State
FIG. 23—Array of Steerable Flat State Optical Elements
FIG. 24—Metamaterial Beam Steering Plates
FIG. 25—Metamaterial Beam Steering Plate Array
FIG. 26—Array of Micro Scanner Direct Projection Optical Elements
FIG. 27—System Integrating Glasses

FIG. 1 shows a monolithically micromachined beam steering device, 102. Its design and function is the subject of patents U.S. Pat. Nos. 5,872,880, 6,086,776, 6,127,926, and 7,201,824 B2. Light is first introduced, from a remote light source, into the core of optical element 116 at point 118 and is emitted from the core at point 120. In one embodiment, the slightly divergent beam travels a short distance through fee space and strikes the surface of double gimbaled micromirror 108. In another embodiment, an optical element such as a ball lens, a GRIN lens, or any other optical element may be introduced after point 120 to modify beam characteristics further on its way to double gimbaled micromirror assembly 106. Once the beam strikes micromirror 108, it can be controllably directed away from the substrate surface with two degrees of freedom.

The first and second nested gimbal frames of double gimbaled micromirror assembly 106 can move independently, and in one embodiment, are driven with electrostatic forces between pads on each respective gimbal frame and substrate wall 110. In this example, an electrical control signal is introduced on pads 112, producing charge flow through address lines 104 resulting in a charge profile on the electrostatic actuator pads. The extent of gimbaled rotations in the up/down and left to right directions is a function of clearance between micromirror assembly 106 and lower v-groove cavity 110, thereby defining the boundaries of beam deflection in the up/down, left/right directions. It can be appreciated that the angular motions and positions of micromirror 108 can be very precisely controlled by the manipulation of current, magnetism, charge, voltage potential, thermal expansion, shape memory effect, or any other presentation of force.

Precision v-grooves 114 and 110 are anisotropically etched into the silicon substrate along the <111> atomic planes. Micromirror assembly 106 and its flexures are fabricated by standard MEMS processes before being released by the anisotropic etch. The resulting v-groove structures provide for highly accurate alignment of the optical axis of element 116 with the center of micromirror 108. It can be appreciated that optical element 116 could take many useful forms including a small laser, or perhaps a laser and GRIN lens combination. It may also be appreciated that a double gimbaled laser could also take the place of the micromirror and directly produce a multi degree of freedom steerable beam.

Figure 2:
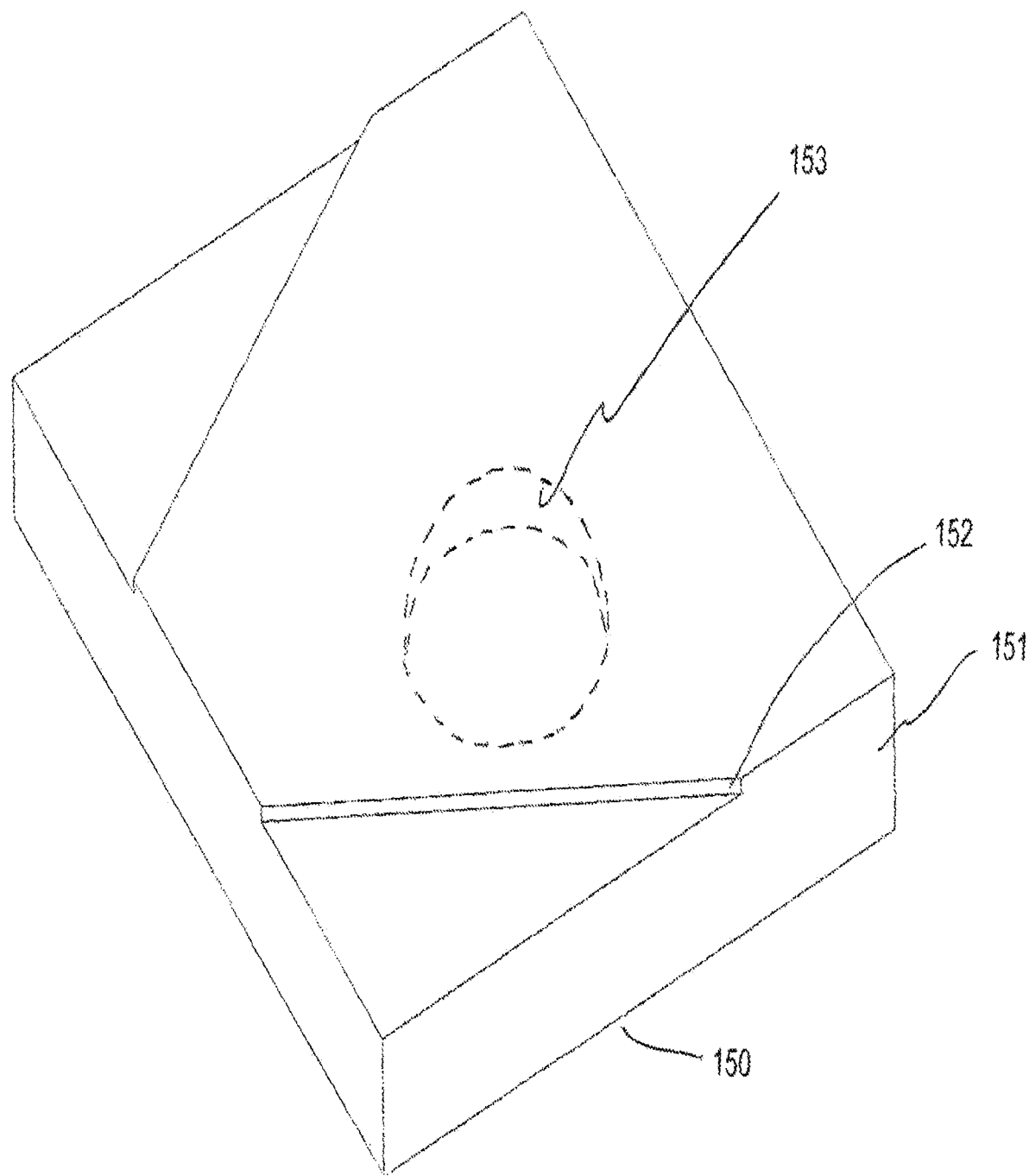

FIG. 2 shows a high Numerical Aperture (NA) negative lens 151. The lower surface 150, exhibits a hollowed out section 153, although it could take any shape, and an upper surface that may be of any shape, including concave, convex, or flat and may be constructed from any optical material exhibiting refraction, reflection, metamaterial properties, birefringence, total internal reflection, etc. In this particular example, one possible function of negative lens 151 is to increase the total compound scan angles produced by micromirror 108. It can be appreciated that additional optics may be placed after lens 151 if a resulting beam profile passing through lens 151 requires further modification. In one embodiment, registration edges 152 are etched into lens 151's upper surface to provide accurate assembly alignment for additional optics such as miniature prism 350.

Figure 3:
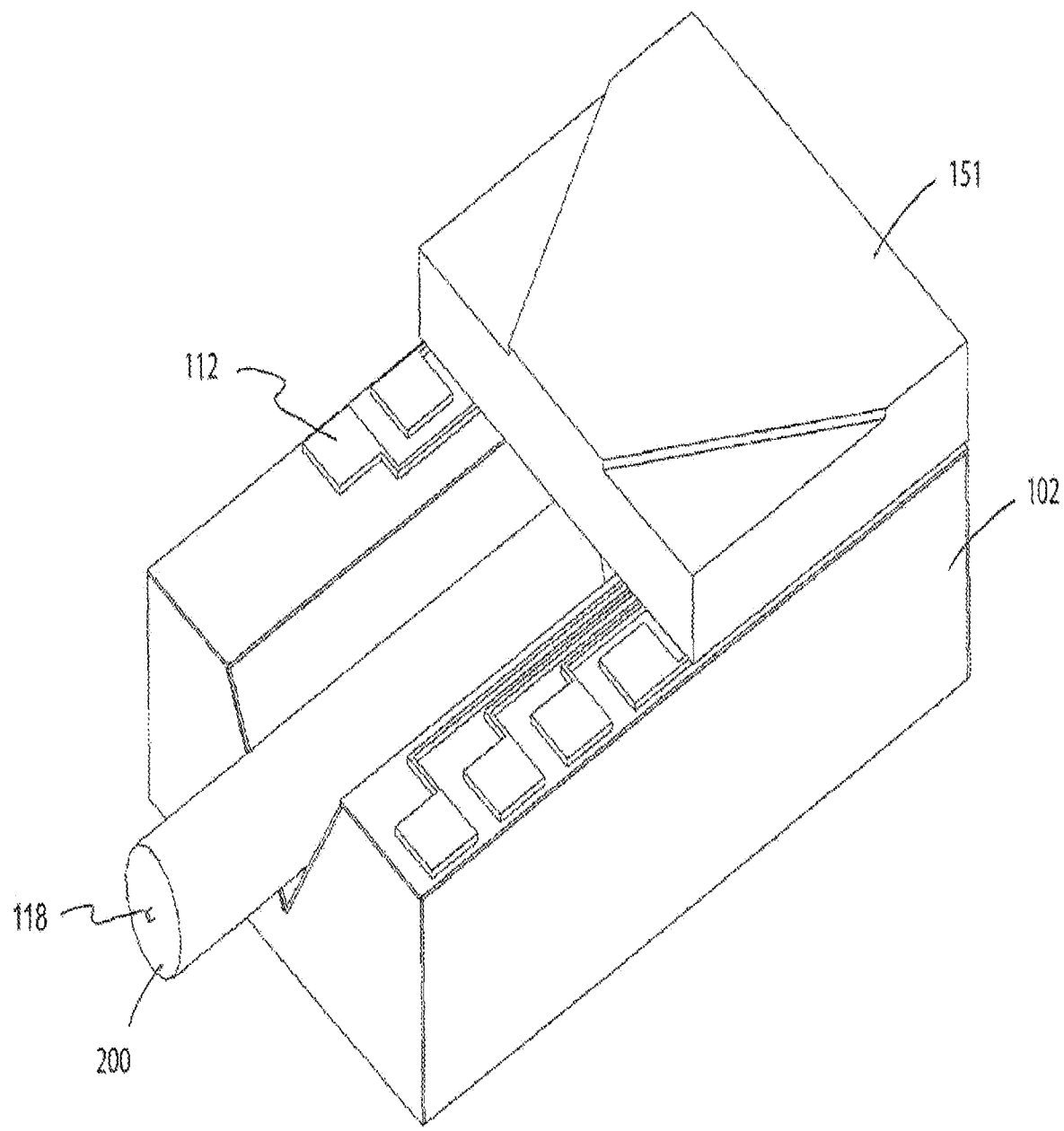

In one possible embodiment, FIG. 3 shows the beam steering device 102 of FIG. 1 mated with lens 151 of FIG. 2. If lens 151 exhibits a net negative diopter, then it will produce an increase in an emerging beam's scan angle with two degrees of freedom. In general, lens 151 may take the form of a doublet, singlet, compound, lenslet array, positive, negative, an achromat, asphere, GRIN, reflective or refractive, multi-dielectric stack, prism, emitter, absorber, light sensor, temperature sensor, magnetic sensor, magnetic coil, photodiode, or any other optical configuration. Lens 151 could also be focusable in that one or more of its optical components could be controllably moved in a direction normal to, or in a direction lateral to a surface of beam steering device 102. Further, relative motions between elements of lens 151 could be controllably provided with piezoelectric stacks, acoustic forces, magnetic forces, electrostatic forces, thermal forces, or any other application of force that is known to those in the art.

Figure 4:
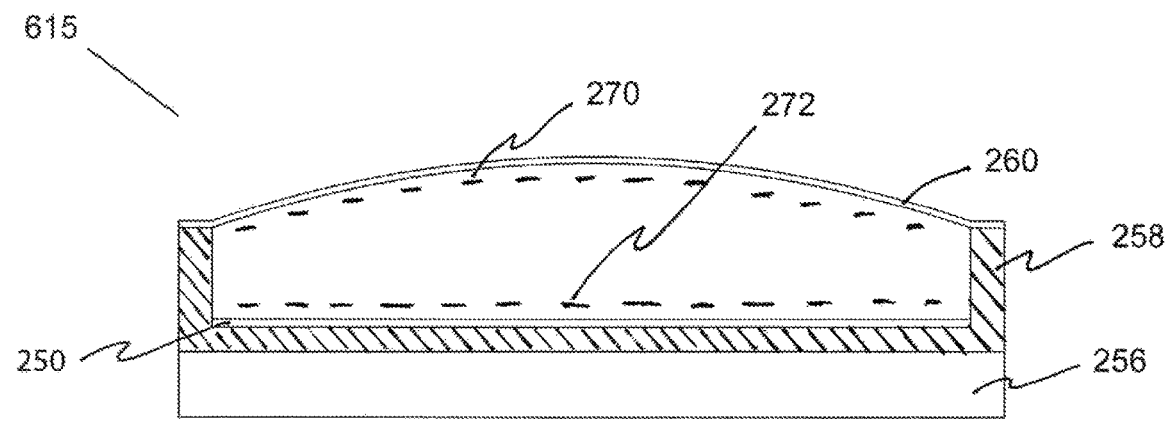
Figure 5:
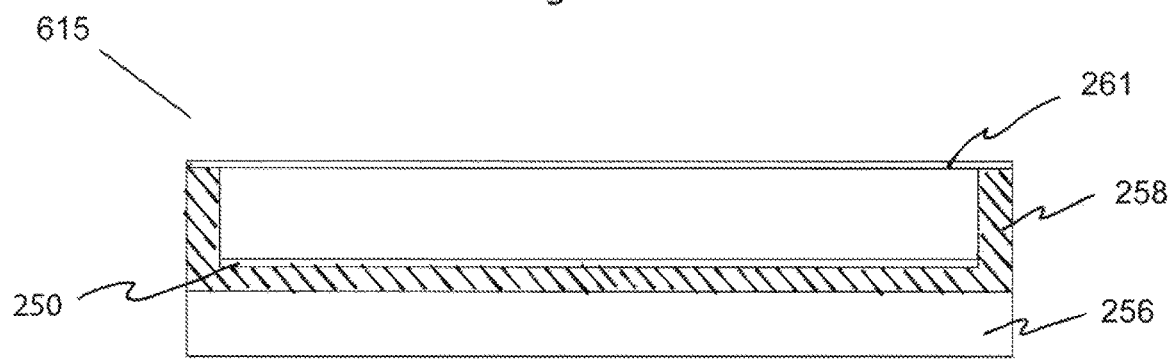
Figure 6:
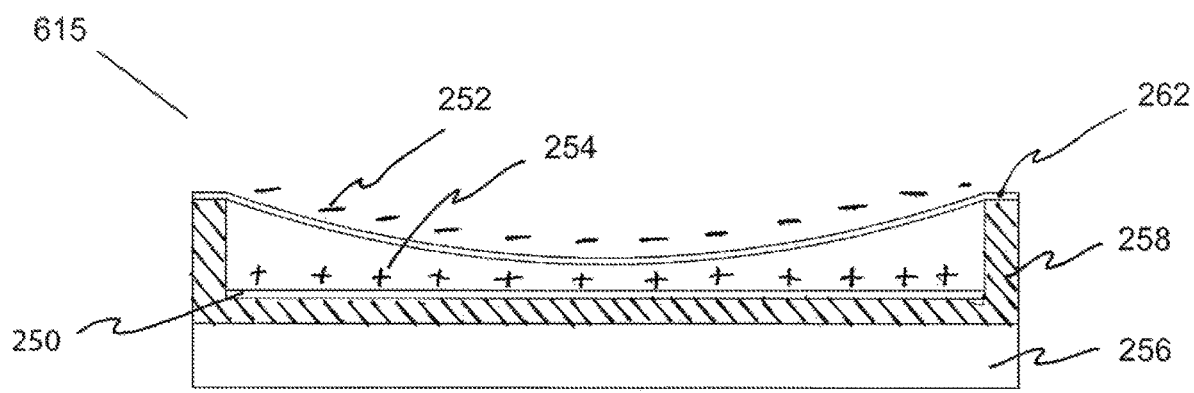

FIGS. 4, 5, and 6 show the cross-section of a Variable Focus Optical Element 615, that has the capability to provide variable focusing power to beams of light impinging on its surface. This can be useful for reforming a divergent beam that strikes concave reflective surface 262, as shown in FIG. 6, or simply reflecting the beam off flat surface 261 in the case of FIG. 5, or scattering an impinging beam in the case of convex surface 260 as shown in FIG. 4. In FIG. 4, negative charges 270 and 272 are injected onto the conductive surfaces 250 and 260, thereby providing a repulsive force that causes the thin film diaphragm 260 to bulge outward. Similarly, in FIG. 6, opposite charges 252 and 254 are placed on the conductive surfaces 262 and 250 respectively. The resulting attractive forces cause reflective surface 262 to assume a concave shape. If no charges are present, then the reflective thin film surface 261 remains flat, as in FIG. 5. For a single mode beam on the order of 10 microns in diameter, this small, SDOF VFOE can respond very quickly to input commands. Insulator 258 can be formed on substrate 256 using standard micromachining techniques. Etching a hollow cavity beneath the optical surface may be accomplished by providing a series of perforations about its circumference. Alternatively, the cavity could be produced prior to wafer bonding with the optical components of the upper surface. There are many equivalent ways in which this device can be fabricated. If conductive, the optical surface might also provide for actuation forces as well. The optical surface of a VFOE 615, can take the form of a simple micromirror, a multidielectric stack, a metamaterial, an optical grating array, a static convex or concave optical element, an actively variable concave or convex optical element, or any other optical element that can transmit, absorb, polarize, upconvert, downconvert, lase, emit, refract or reflect electromagnetic radiation.

It must also be noted that the method of action should not be limited to electrostatic forces only. For example, microcoils formed on surfaces 260, 261, or 262 and lower conductor 250 can produce magnetic forces sufficient for deflection, or a magnetic material could be utilized on a surface facing a micro-coil to provide these forces. Gas or liquid pressure within the cavity could also provide a deformation force. These pressures could be provided by a high or low pressure source, or could be produced by a hot or cold sink imparting work on the fluid. Similarly, thermal bimorph, shape memory effects and phase transformation of some solids such as wax could also provide these desired deflection forces. In fact, any force implementation to produce controllable deflections of the reflecting surfaces may be used.

Figure 7:
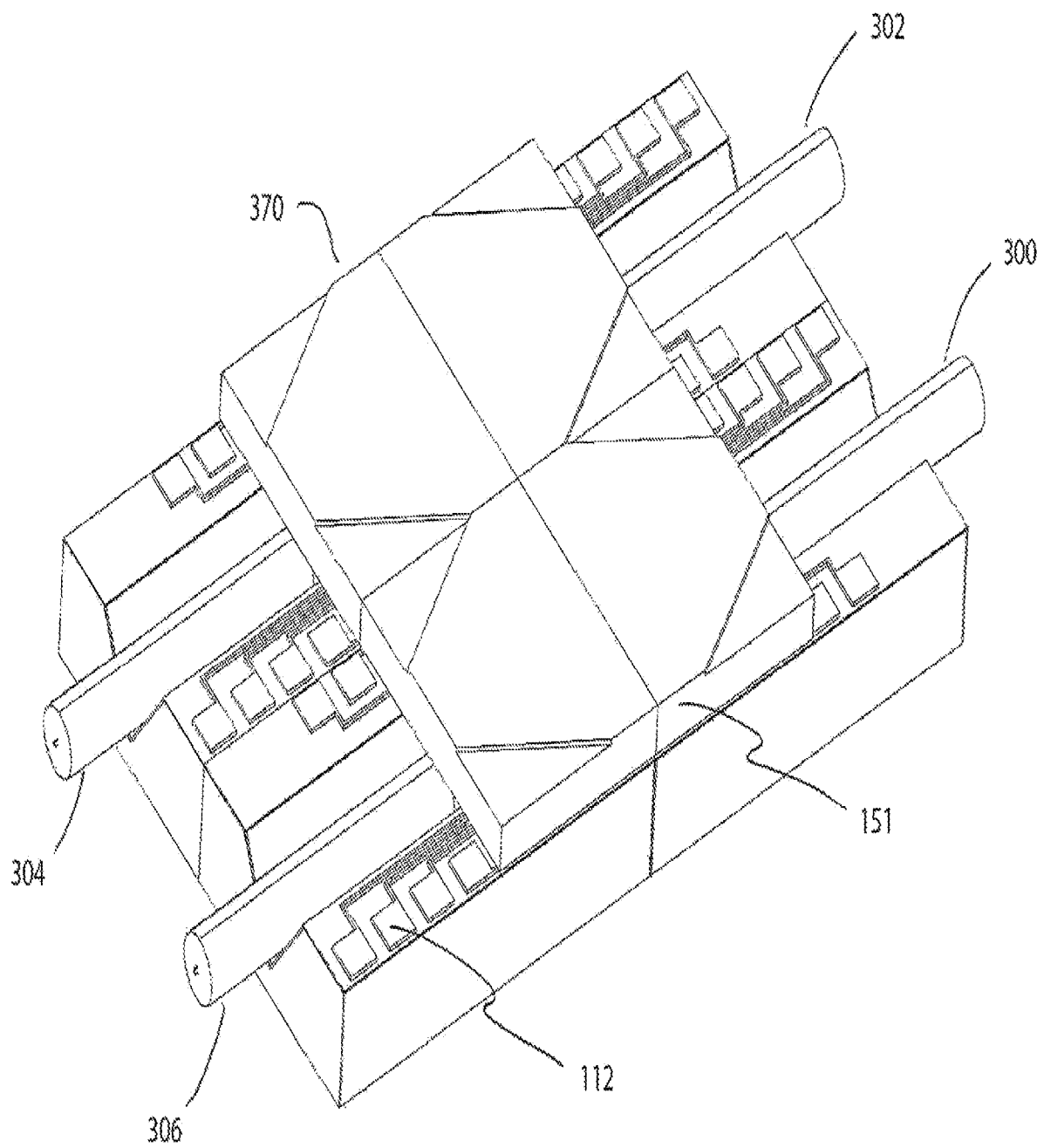

In one embodiment shown in FIG. 7, quad array 370, is defined by a grouping of four micromachined beam steering devices 102, that are provided with negative lens elements 151. Optical elements 300, 302, 304 deliver the single frequency colors of red green and blue to the steering micromirrors, 108. The fourth optical element, 306, can be used to expand the color gamut with an additional color such as yellow, or may be used as a scanning sensor to detect incoming light signals to determine, in one example, the reflected position of the pupil with respect to the head. As before, pads 112 deliver voltage control to independently steer each of the four micromirrors 108. Of course any frequency or combination of frequencies can also be delivered through any one of these optical elements.

Figure 8:
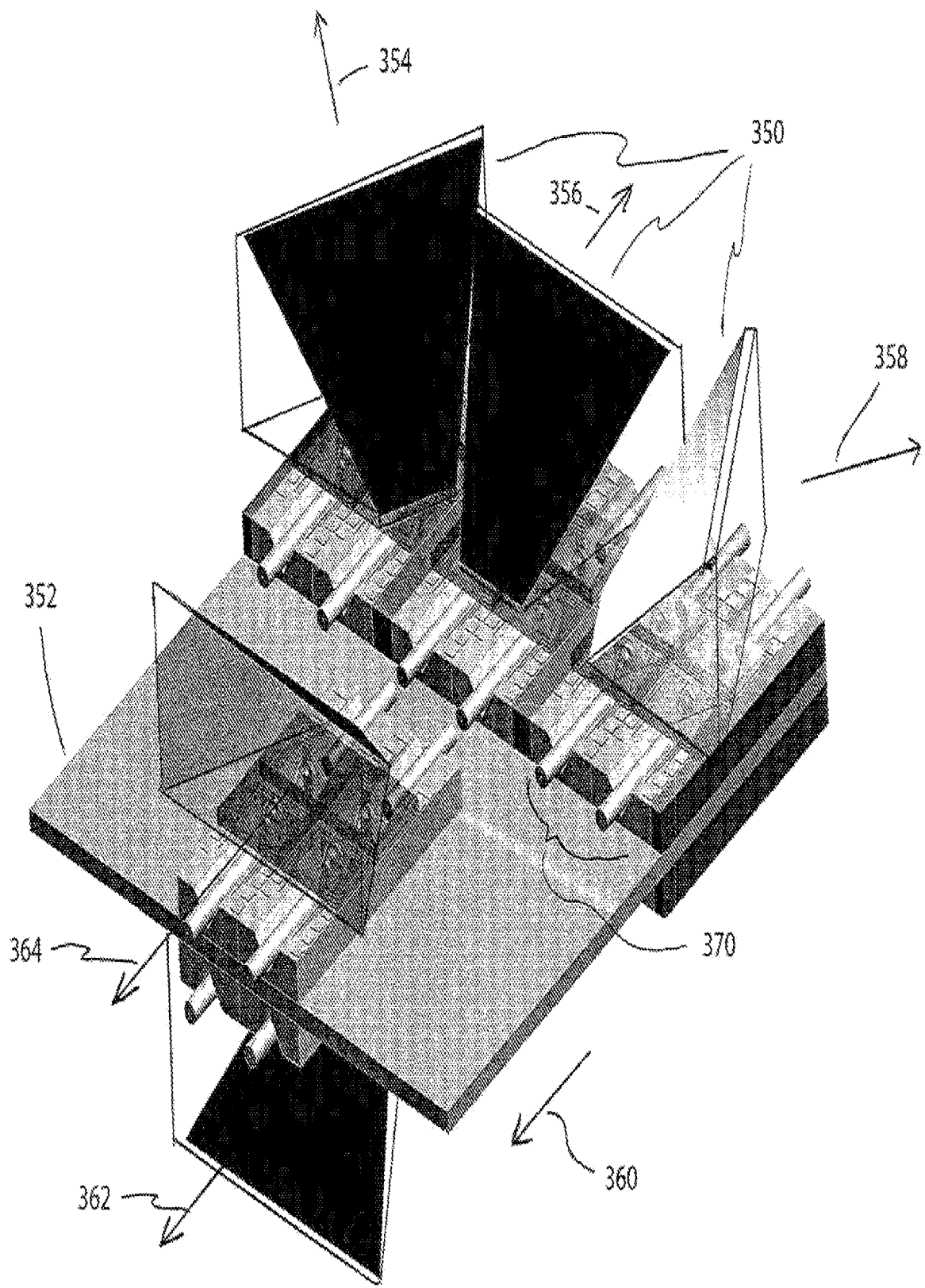
Figure 9:
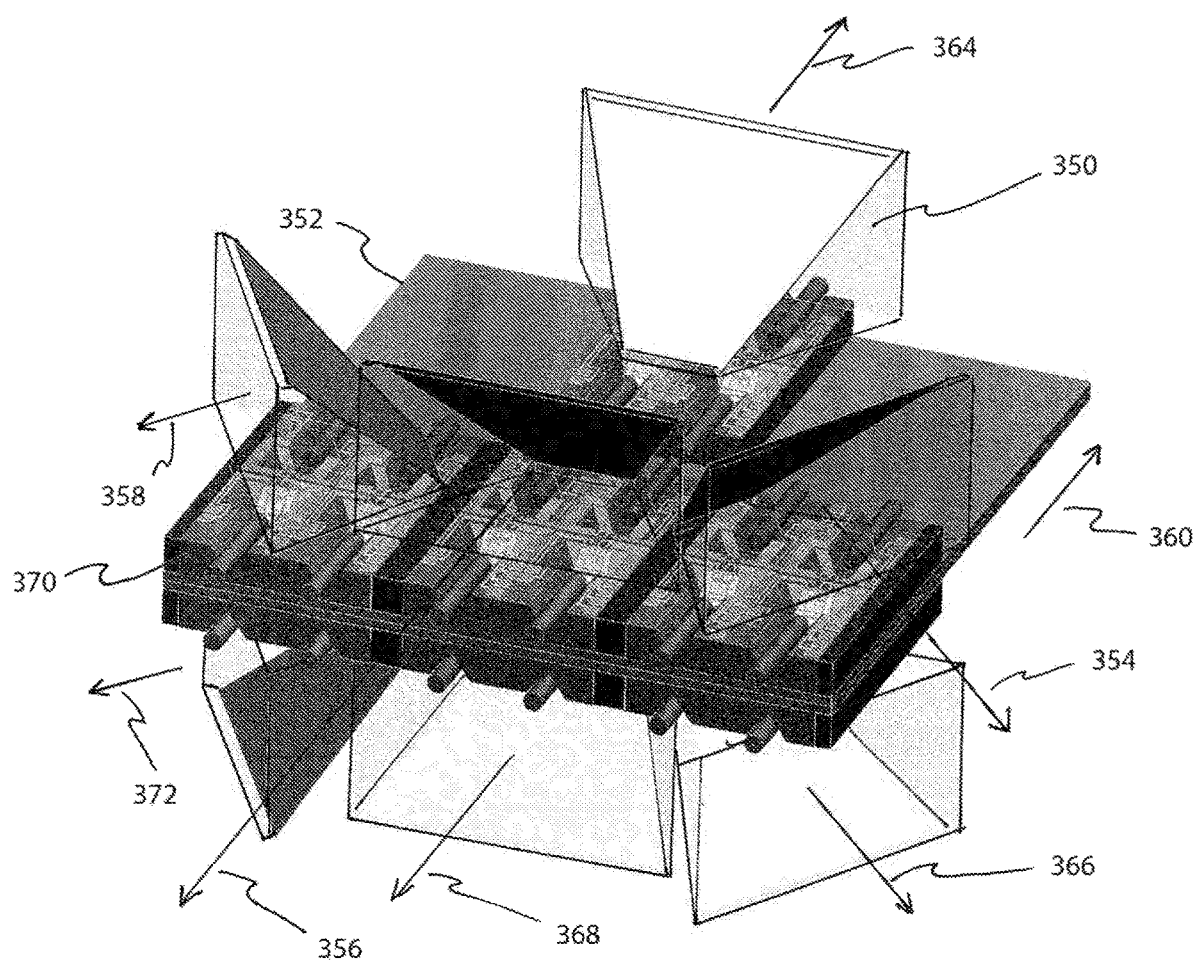

FIGS. 8 and 9 show one possible combination of a multitude of sub-projectors 371. The grouping, taken as a whole, will be referred to as a Wide Angle Scanning Array Projector or WASAP. As a two degree of freedom beam emerges from quad array optical scanner, 370, it is projected up and away from its upper surface, then deflected in the horizontal direction by right angle turning prism, 350. As described previously, the miniature prism, 350, is bonded to the surface of the quad array, 370, and is precisely aligned over the emerging beams with the help of registration grooves 152. This creates a sub-projector, 371. Then eight of these sub-projectors are placed on a common substrate, 352, and fixed at predetermined relative angles with a high degree of precision. Three sub-projectors, 371 facing to the rear, cover approximately 180 degrees of scan angle on the upper surface of substrate 352 as exemplified by vectors 354, 356, and 358, wherein each sub-projector 371 provides for 60 degrees of scan angle in this one particular embodiment. A single sub-projector 371 on the upper surface faces forward as shown by vector 364. An identical symmetric configuration is provided with four more sub-projectors 371 on the lower surface of 352, thereby providing an additional scan space defined by vectors 366, 368, and 372. In this particular example, approximately 180 degrees of horizontal scan and 120 degrees of total vertical scan are provided. The forward facing sub-projectors 371 directly project into the eye so as to "hide" the WASAP from a direct gaze forward. Of course, if the WASAP is located out of the field of view, then forward projecting sub-projectors 371 would not be needed. It can be appreciated that FIGS. 8 and 9 show one possible combination of a multitude of quad array optical scanners 370. Further, it can be appreciated that in its simplest form, a single beam steering device 102 affixed to a headset in close proximity to the eye could provide a full immersion, wide angle view.

Figure 10:
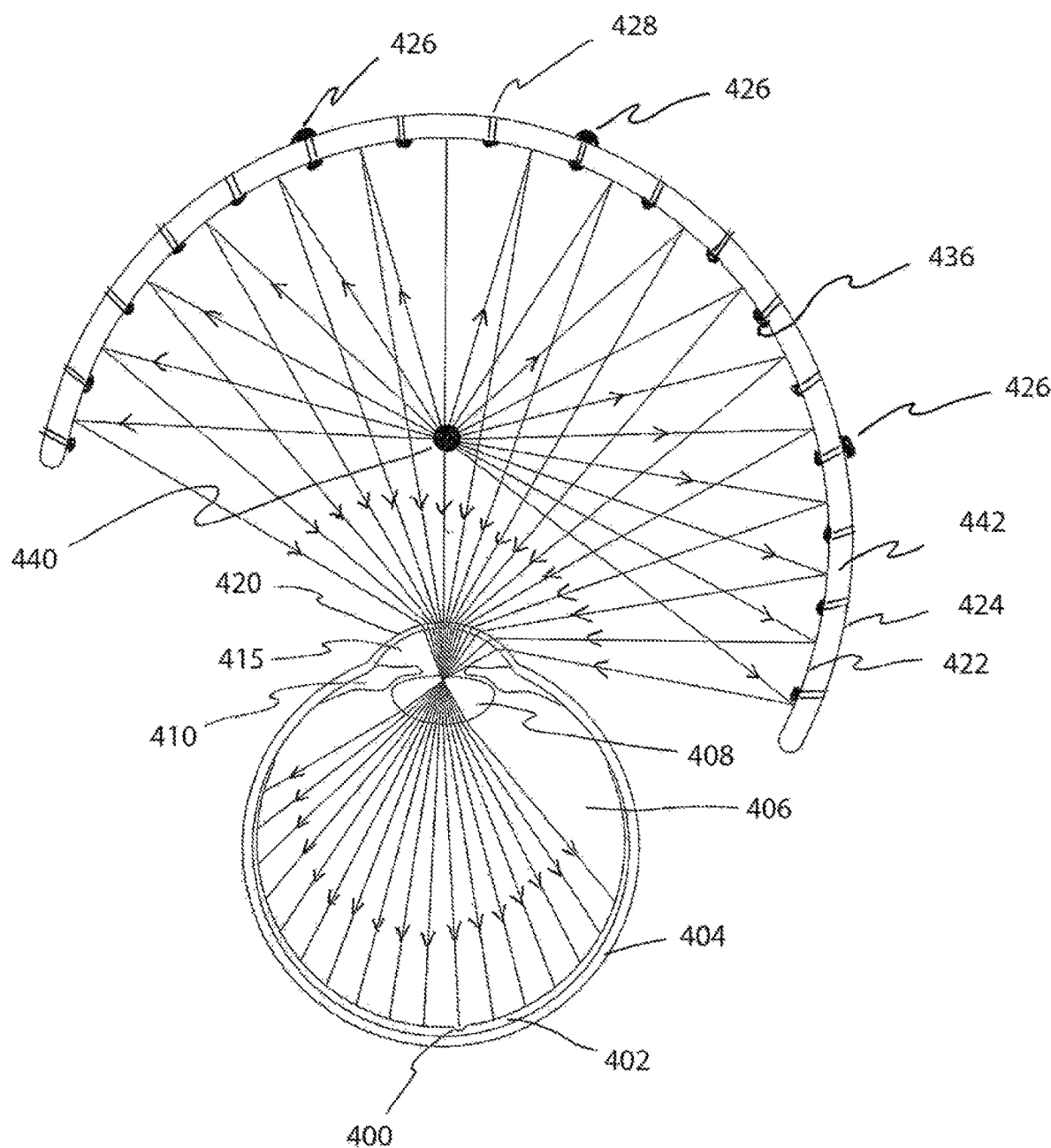

FIG. 10 shows the general layout of a reflector scanner imaging system and its interrelation of components that projects a wide angle, full color gamut, high resolution image directly to the eye. This view is a horizontal cross-section of the imaging system. The ray traces are equally valid for any other plane whose normal vector is orthogonal to the optical axis of the projector's field, or the eyes' axis. A scanning projector 440, is placed near the center of an approximately conic reflector, 442. A compound curved, first surface mirror, 422, provides a means for reflecting beams emanating from scanning projector 440, back towards the pupil, and ultimately, the retina. The angular position of the pupil may be determined with a form of "eye tracker" using a pulse of IR light provided by one or more IR emitters 428. It may be appreciated that other wavelengths of light may be used as well. An array of eye tracking sensors 436, disposed on the inner surface of reflector 442, detect reflected light from the user's pupil and/or cornea.

This information can be used to deduce the exact position of the eye relative to the head. Eye tracking sensor 436 can also take the form of an inward looking camera. A camera can be used in the usual way to observe corneal reflection patterns, retina physiology, or the dark IR reflections emanating from the pupil to ascertain eye position. Another novel approach would require the "ink jet" assistance of placing one or more fluorescing dots directly on the user's cornea or sclera. Although invisible in normal light, a pulse of deep violet light would provide cameras or sensors with the exact registration position of the eye. Using two or more dots would provide for the determination of eyeball rotation as well.

The outer surface, 424 of reflector body 442 is shown with forward and lateral looking, wide angle cameras, 426. These cameras would provide the exact field of view and binocular vision one would see if no display were present. By passing along this visual data and incorporating it into the VR data stream to each eye, the illusion of wearing no glasses at all would be complete. Of course these cameras might also detect other wavelengths of light including UV and IR. In addition, any other sensor could produce "synthetic vision" by providing magnetic, radio, acoustic, sonar, or radar data to name a few. Any radiation source that is detectable is viewable.

The shape of reflector 422 is approximated by ray tracing backwards from the retina to the scanning projector. The method is as follows.

A fundamental assumption is made here that a rod or cone cell's response to an impinging photon is invariant with respect to angle of impingement.

The following is a method for obtaining the surface form of a passive reflector that can transmit a highly collimated, focused beam to each and every rod and cone cell on the retina.

1) Obtain the family of vectors that is characterized by a ray trace originating from each and every rod and cone cell within a defined sector of the retina, wherein the ray proceeds through the center of the exit pupil and proceeds out from the cornea.
2) Arbitrarily select a projector point on the straight ahead gaze optical axis a given distance from the surface of the cornea.
3) Define a sphere of a given radius, centered on the point of projection selected in step 2.
4) Select a vector emanating from the center of the retinal sector analyzed in step 1.
5) Find the 3D point of intersection of vector 3, and the surface of sphere 3.
6) Calculate, if it exists, the normal vector for the differential reflector surface element that will satisfy equal angles of incidence and reflection.
7) Select another vector from set 1 and repeat steps 5 and 6.
8) Stitch together the correctly oriented surface elements found in steps 6 and 7. If the surfaces are not contiguous, then modify the initial projection radius until it is.
9) Repeat steps 7 and 8 until the full vector set in step 1 is exhausted.
10) If the resulting piecewise reflector surface is smooth and contiguous, repeat 1-9 to find all such sector surfaces and stitch together to form the finished reflector.

If the resulting surface cannot be made piecewise contiguous or smooth, then iterate to a solution in the following manner.

11) Increase or decrease the initial diameter of the projection sphere in step 3 and recalculate until a satisfactory surface is found, or
12) Move the point of projection closer or further from the cornea in step 2 and recalculate, or
13) Obtain a second, much larger set of vectors within the selected retinal sector that represent a ray emanating from a photoreceptor through any point within the exit pupil.
14) Select the smoothest surface previously found, and recalculate for the new set of photoreceptor vectors found in step 13.

If an acceptable reflector surface still cannot be found, then a corrector lens may be added.

Finally, if all else fails, then an adaptive optical or metamaterial reflector will satisfy the surface solution for all central exit pupil vectors.

A passive reflecting surface defined thusly, will provide for full access to every photoreceptor in the eye. However, if a distortion free, true near-field image behind the retina is difficult to create using a passive display alone, an adaptive reflective surface may be used instead.

So, once all visual or other data has been gathered and processed by high speed algorithms and transforms in such a way that addressing each photoreceptor with the correct intensity, color, timing, and relative position to provide the illusion of a true image projecting on the surface of the retina, then that information is passed to the scanning projector 440.

Having a full scan field, the projector emits multiple simultaneous scans from each sub-projector, 371, to each sector of the visual field it has been assigned to address.

Each beam from the six rearward facing sub-projectors reflect off first surface reflector 422 and impinge on the cornea 420. The light then passes through the aqueous humour 415, past the iris, 410, through the crystalline lens, 408, through the vitreous humour 406, and onto the surface of the retina, 402. With eye tracking information, it is possible to increase the bandwidth of a sub-projector 371, when the forward gaze of the eye is in the visual field assigned to it. This is advantageous because visual acuity is by far, the greatest at the center of the visual field, as determined by the fovea, 400. And bandwidth, of course, is not unlimited, so smart allocation may be in order.

Prior art teaches many methods for determining the position of the pupil relative to the head. The most commonly used form of gaze sensor consists of a remote or head mounted source of IR light that is projected towards the eye and a remote or head mounted camera that can observe the pupil position or the resulting reflection patterns from the cornea.

Figure 11:
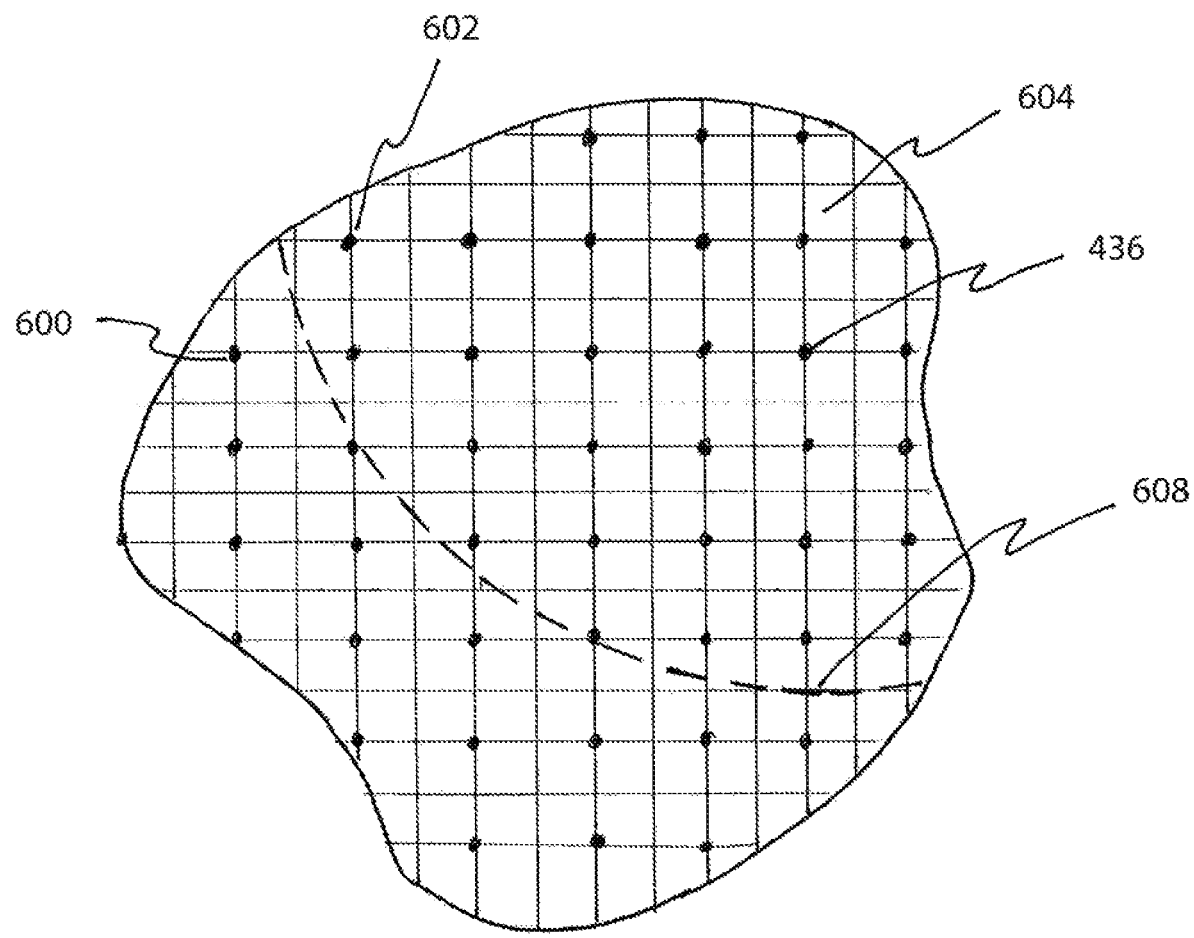

FIG. 11 shows one possible configuration for a high speed eye tracker, wherein the inner surface of reflector body 442, is covered with an array of photodiodes, 436. These photodiodes, 436, are interstitially placed between beam reflectors 604, or direct projection sub-elements, 820. A short burst of IR radiation is sent to the eye via IR emitters 428, or scanning projector 440. The resulting return signal is projected onto the sensor array and the pupil's image is found by comparing the strength of the signal from those sensors that are in a "shadow" 602, and those sensors that are in a bright area, as is sensor 600. With a fine enough coverage, a good geometric image of the pupil radius, 608, can be determined and the center of gaze can then be deduced. As photodiodes can respond very quickly to a signal, this would provide for a high speed eye tracker.

Figure 12:
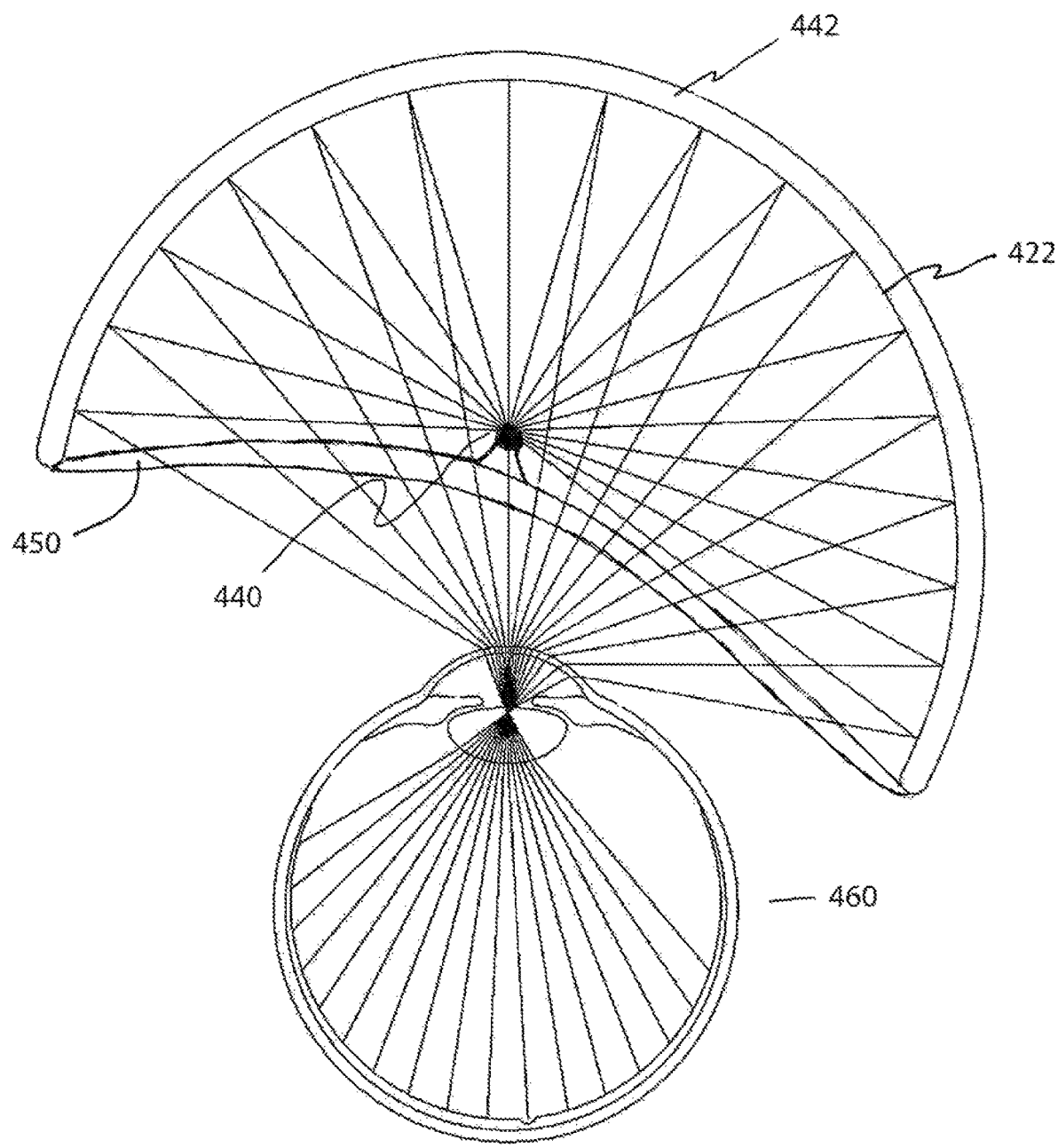

FIG. 12 shows one way in which the immersive optical projection device might be sealed. The introduction of a refractive corrector plate, 450, provides for both sealing the delicate first surface reflector, 422 and scanning projector 440, as well as correcting for a user's astigmatism, or furthering the refinement of the projected beams as they ply their way to the eye, 460. The reflector body, 442, may be hermetically sealed to the corrector plate, 450, providing for a moisture resistant environment.

Figure 13:
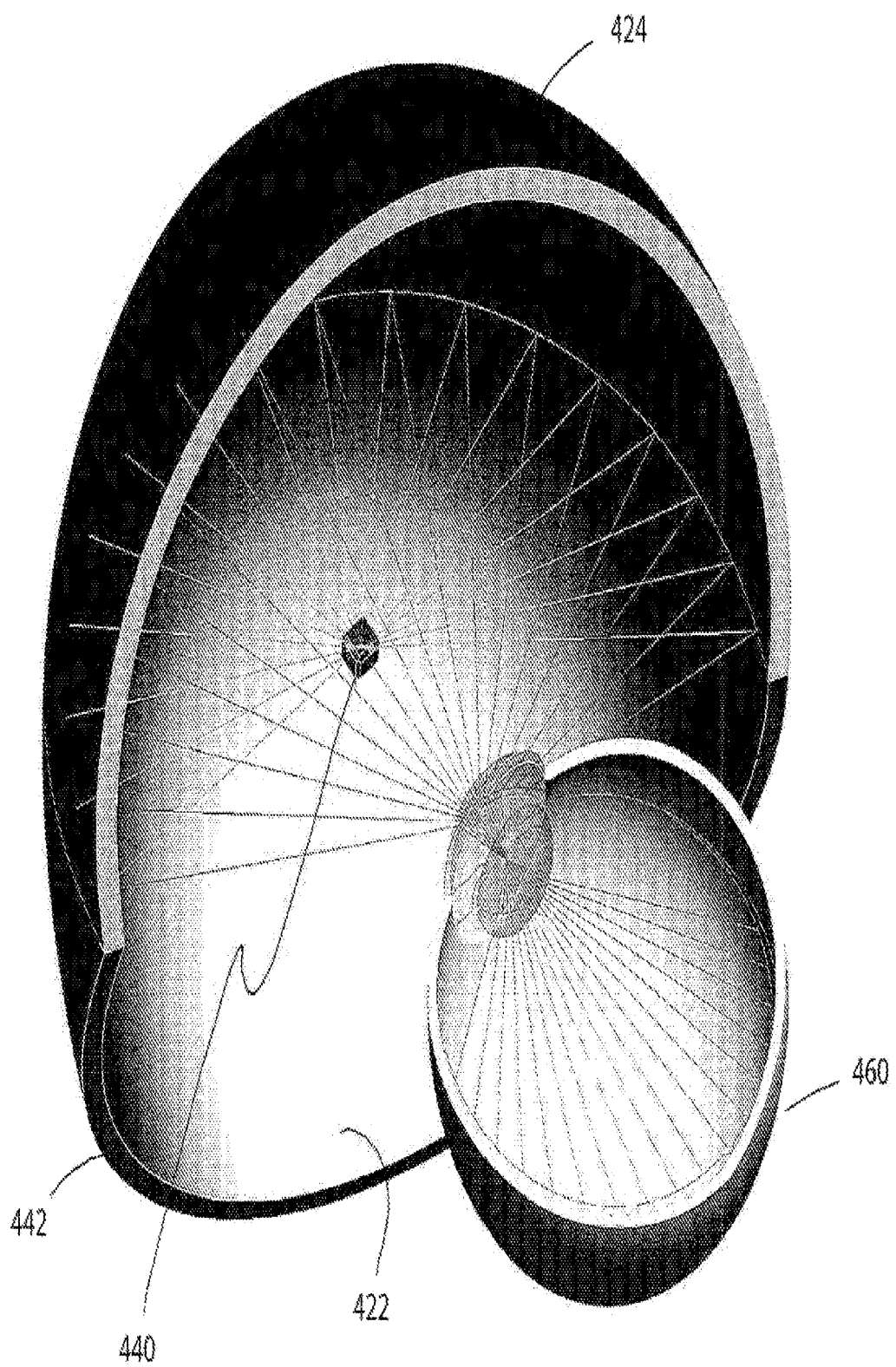

FIG. 13 shows an isometric 3D view of the reflector scanner imaging system and the relative positions of the eye, 460, the reflector body, 442, the scanning projector, 440, the first surface reflector, 422 and the outer surface of the reflector body 424.

Figure 14:
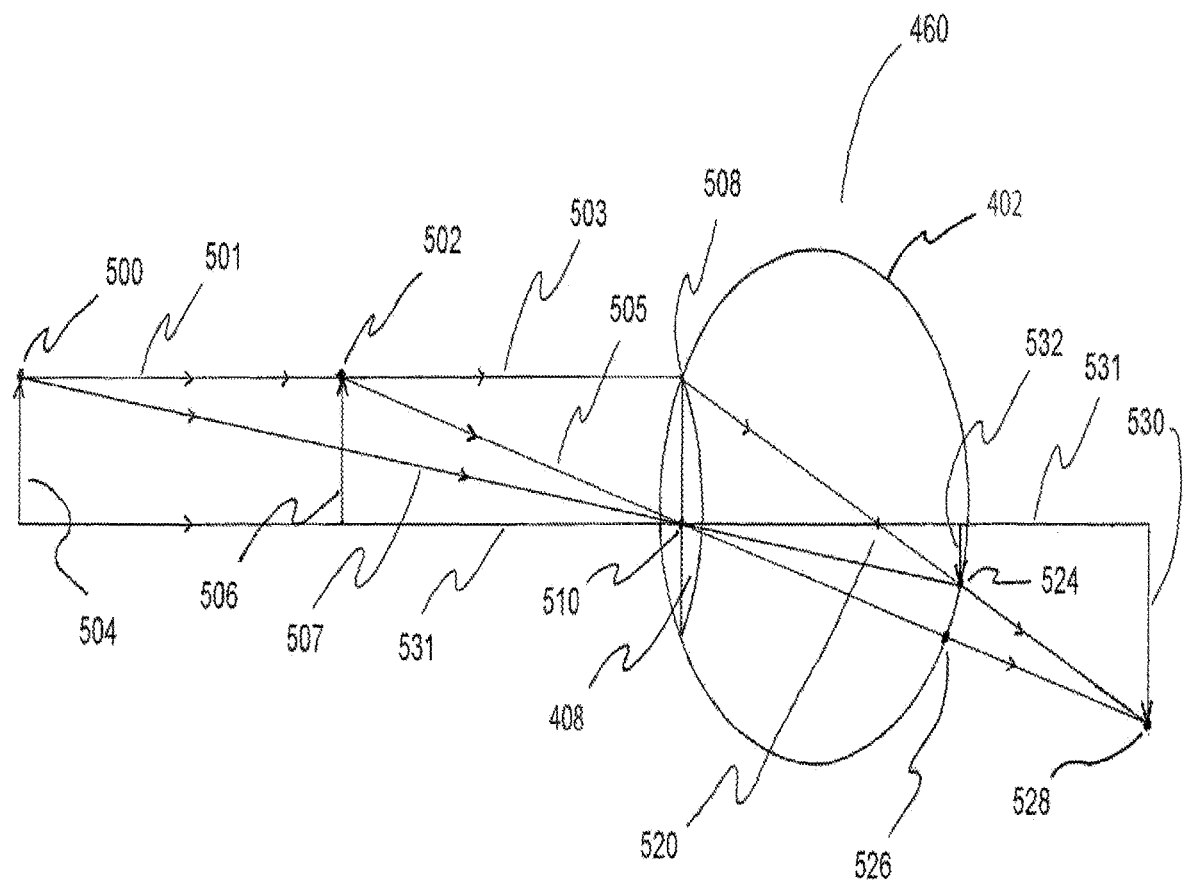

FIG. 14 shows the optical paths of a near object and the resultant images produced on and behind the retina. A vertical cross-section of the optical paths involving a distant object 504, and a near object 506, with respect to eye 460 is shown. The retina, 402, is represented by a circle and the crystalline lens and cornea are represented by a simple double convex lens, 408, with a focal length found at point 520. Using simple lens geometry, we select a horizontal beam of light, 501 emanating from the tip 500, of distant object 504, and traveling parallel to the optical axis 531 of the eye. The beam progresses to point 508, and is refracted through lens 408, passes through focal point 520, and strikes retina 402 at point 524 forming the tip of real image 532. A ray 507, passing from 500 through the center of lens 408 remains unaltered and also reaches tip 524. As expected, the real image 532 is inverted and focused on retina 402.

A similar ray tracing process from the tip 502 of near object 506, produces a real image 530 that comes to a focus behind the eye at image tip 528. It can be seen that beams 503 and 505 emanating from near tip 502 pass through the edge 508 and center 510 respectively of lens 408, and impinge on retina 402 at points 524 and 526 respectively. Because they do come to a focus on the retina, near object 506 appears blurred. If lens 408 attempts to accommodate to the blurred image, it will thicken, thereby increasing its optical power, and move near image 530 into sharp focus on retina 402.

Figure 15:
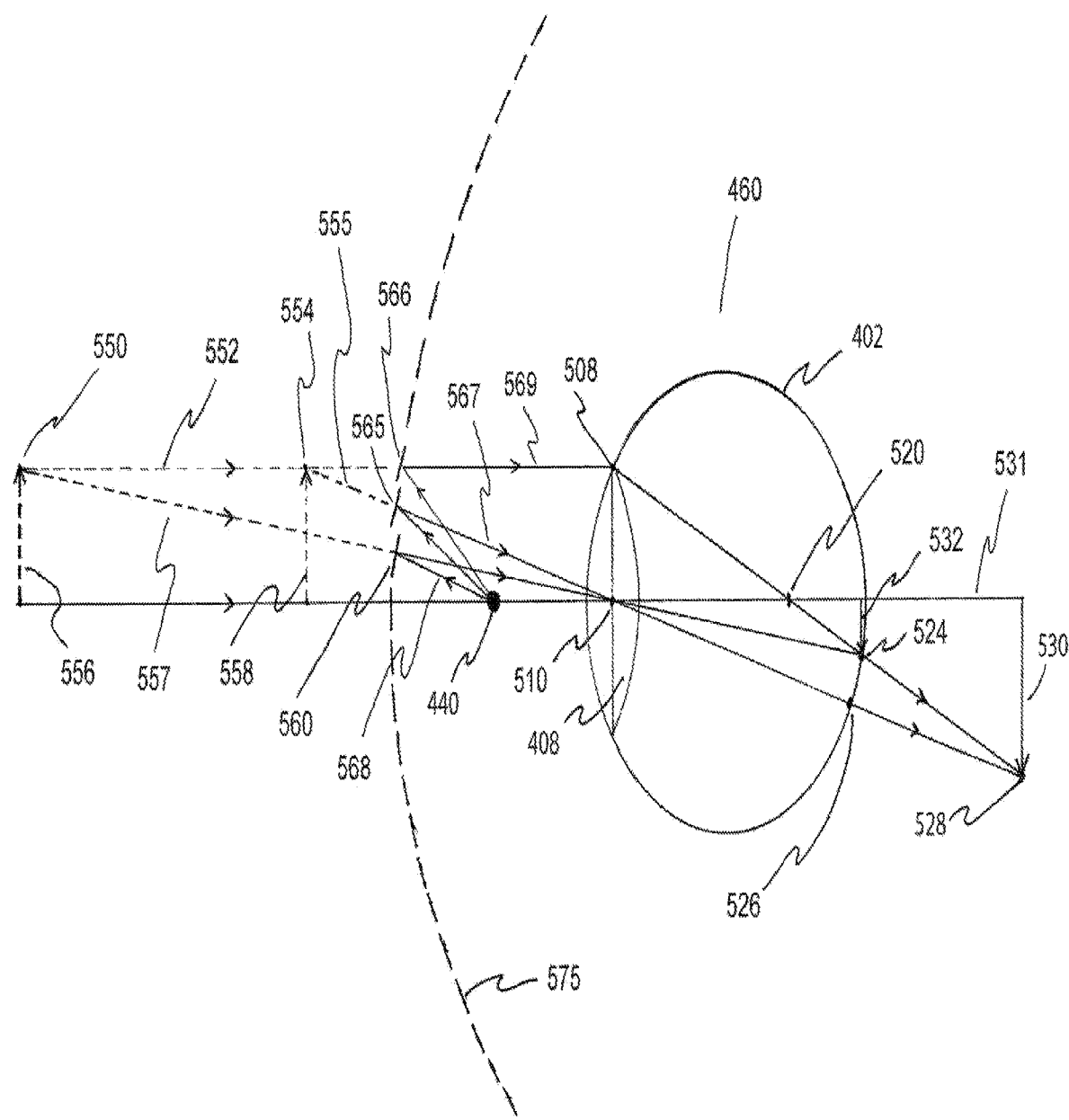

FIG. 15 shows how an adaptive reflector array 575 can produce a real image exhibiting a true depth of field by selectively steering beams from a projected virtual object. In FIG. 15, distant virtual object 556 and near virtual object 558 replace the real objects 504 and 506 respectively, found in FIG. 14. In addition, an adaptive reflector array 575 is placed in close proximity to the viewer's eye 460. The adaptive reflector array has the property that a multitude of steerable optical elements covering the surface closest to the eye can be individually adjusted at will to modify the trajectory of an impinging beam of light. This can be useful for emulating the divergent ray properties produced by a nearby object, as well as the nearly parallel ray emanations from a distant object.

Beginning at the tip 550 of distant virtual object 556, a horizontal virtual beam 552, parallel to optical axis 531, proceeds to point 508, and is refracted through lens 408, passes through focal point 520, and terminates at point 524 on retina 402. And virtual beam 557 departs from point 550, passes through the center 510 of lens 408, and likewise terminates at point 524 on the retina. Of course a real image is not formed since virtual objects do not produce photons. However, by precisely defining the theoretical direction, color, and intensity of a virtual beam at the exact point of intersection with adaptive reflector array 575, and substituting, at each point on the surface of that reflector array, a real beam of light exhibiting those exact properties, then a real image 530 of the virtual object 556 will be formed.

To create a real image of distant virtual object 556, a real beam 568, having the correct properties of direction, intensity and color calculated for virtual object 556 at that point, is emitted by projector 440 towards adaptive steerable optical element 560. The steerable optical element 560 is tilted slightly out of plane with respect to reflector array 575 insuring that beam 568 is directed towards point 524. Similarly, a correctly calculated beam 569 is emitted from projector 440 and strikes tilted steerable optical element 566 and proceeds to point 508, and onto retina 402 at point 524.

To create a real image of near virtual object 558, a real beam 567 having the correct properties of direction, intensity and color calculated for the virtual object at that point, is emitted by projector 440 towards adaptive steerable optical element 565. The steerable optical element 565 is tilted slightly out of plane with respect to reflector array 575 such that beam 567 is directed towards focus point 528. Similarly, a correctly calculated beam 569 is emitted from projector 440 and strikes tilted steerable optical element 566 and proceeds to point 508, then point 520 and arrives at the point of focus at 528.

Because the adaptive reflector array 575, in conjunction with projector 440, can produce real images at any depth of focus from calculations derived from virtual objects, the eye should not be able to distinguish the difference between a real and virtual depth of focus. The images will appear just as real, and the crystalline lens will accommodate to the appropriate focus just as if it were produced by a real object.

In this one example, the adaptive reflector array 575 is comprised of single DOF steerable optical elements. That is, the rotation axis of any steerable optical element is normal to any vertical plane of cross section having point 510 in common. This may be insufficient to produce the full range of optical properties, angles, and depths of field for the most general virtual scene. In addition, in order to produce a spot size on the retina of 5 microns, representing 20/20 visual resolving power, then it would be desirable to steer, in a coordinated fashion, a beam of approximately 2.5 mm in diameter. Also, if viewer astigmatism or any other off axis optical errors are in need of correction, then an array of two DOF or three DOF steerable optical elements can be employed. In the most general case then, an adaptive optical reflector 575, composed of two DOF or three DOF steerable optical element arrays would provide for a corrected, real image, with full binocular cues and a true depth of field requiring crystalline lens accommodation for a total sense of visual immersion.

The methodology for projecting a real, near field image from a virtual object is as follows.

1. Define a spherical surface S of radius Ri, centered on the pupil, where Ri is initially the closest desired focal distance in front of the viewer.
2. Find the intersection between the virtual scene components and the surface of sphere S.
3. Calculate the proper intensity, color, location, and direction of all light beams produced by the virtual object.
4. Calculate the tilt angles of all steerable optical elements on adaptive reflector array 575 to simulate the virtual elements found in steps 2 and 3.
5. Actuate those steerable optical elements and project the calculated beams from scanning projector 440, onto those elements only.
6. Increment Ri by a small amount (move the cross section of the virtual object further away).
7. Repeat the full process from step 1 forward until the full front to back scan is complete.

OR

1. Repeat steps 1 through 5, but scan all areas of the adaptive reflector array 575, thereby including distant imagery with near objects during a single projection.
2. Continue with steps 6 and 7 as above.

Figure 16:
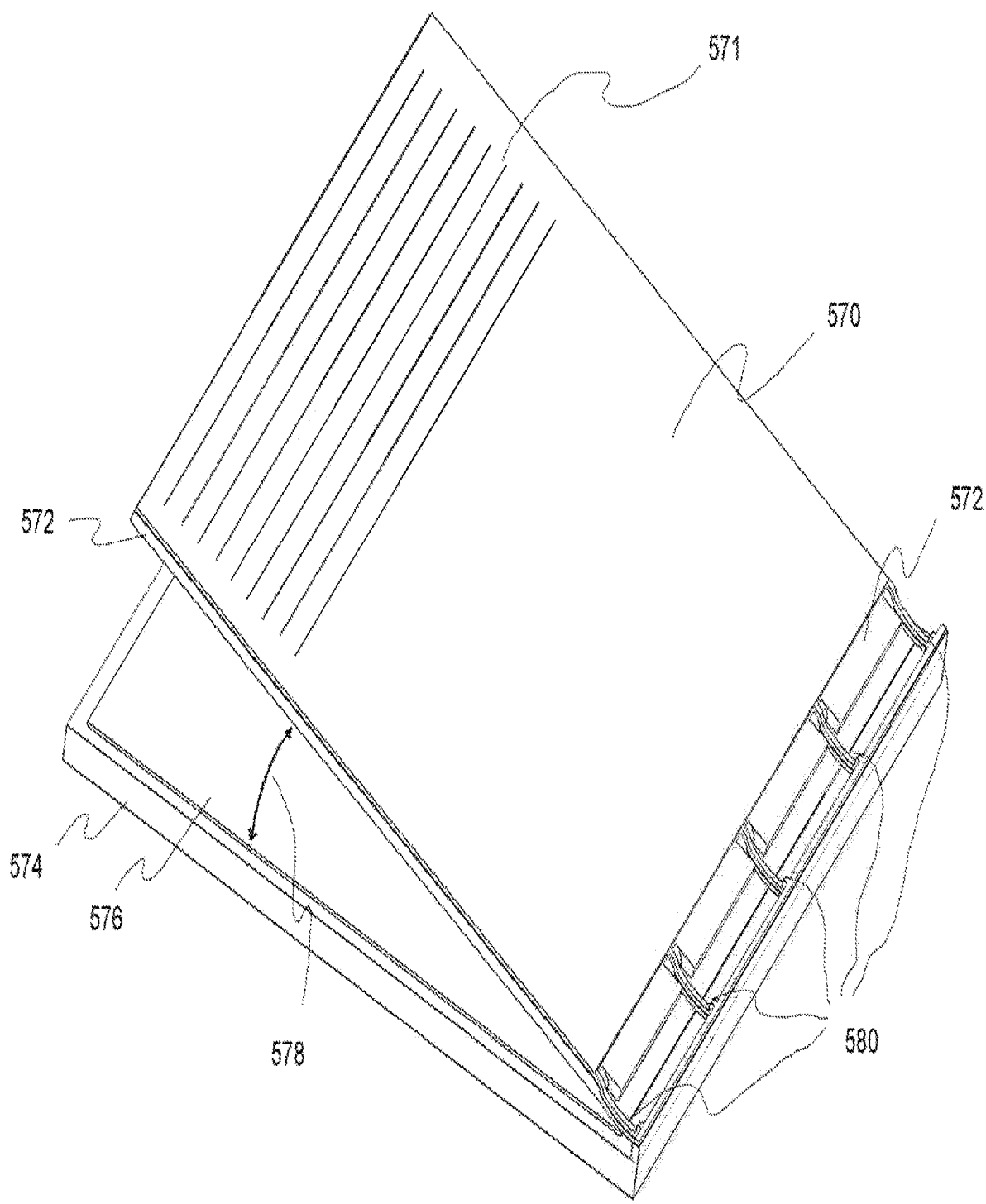

FIG. 16 shows a single degree of freedom V-Gap Optical Element. The optical surface, 571, can take the form of a simple micromirror, a multidielectric stack, a metamaterial, an optical grating array, a static convex or concave optical element, an actively variable concave or convex optical element, or any other optical element that can transmit, absorb, upconvert, downconvert, lase, emit, refract or reflect electromagnetic radiation.

In this embodiment, the VGOE is composed of an optical surface 571 that is supported by an upper substrate 572, that can be controllably opened to a v-gap angle 578 relative to a lower substrate 574. In one configuration, a controllable, antagonistic force is established between hinges 580 and an electrostatic force provided by charges present on the actuator surface 570 of upper substrate 572 and actuator surface 576 on lower substrate 574. If v-gap angle 578 is zero when the device is inactive, then the controlled introduction of like charges on actuator surfaces 570 and 576 will cause the v-gap angle to increase, overcoming the closing forces of hinges 580. If hinges 580 normally force the upper substrate 572 into a positive v-gap angle 578 with respect to lower substrate 574 with no charges present on surfaces 570 and 576, then the introduction of opposite charges placed on actuator surfaces 570 and 576 will provide a v-gap closing force to overcome the hinge 580 opening forces. In either case, a precise v-gap angle 578 can be established by controlling the charges present on actuator surfaces 570 and 576.

It can be appreciated that magnetic forces could be substituted for electrostatic forces thereby producing the same control of v-gap angle 578. Equivalently, hinges 580 could be comprised of a thermal bimorph, a piezoelectric bimorph, or a shape memory element, thereby providing an opening or closing motion to control v-gap angle 578 without the use of electrostatic or magnetic driving forces. In this example, the variable capacitance established by the two actuator surfaces 576 and 570, could provide a voltage feedback signal to actively control v-gap angle 578. Similarly, any optical, magnetic, thermal, electrical, mechanical, stress, or strain sensing circuits monitoring hinges 580 or of v-gap angle 578 could also provide a feedback signal to precisely control the gap angle.

Optical surface 571 could take the form of an optical grating that produces bright colors from reflected white light wherein the reflected wavelength is dependent on the relative angle between the grating, the light source and the observer. In another embodiment, the frequency output of optical grating 571 could be controlled electronically wherein the spacing between each successive ruling can be varied. In yet another embodiment, various colors might be produced using an electronically variable thin film interference device wherein an electronically controlled gap between a transparent or translucent upper surface and a reflective lower surface is provided. The controllable gap might be a vacuum gap in one configuration or a media filled gap in a multitude of alternate configurations. In other configurations, the color of optical surface 571 could be controlled by magnetically, electrically, optically, or thermally varying a spectrally dependent reflecting micro structure.

Figure 17:
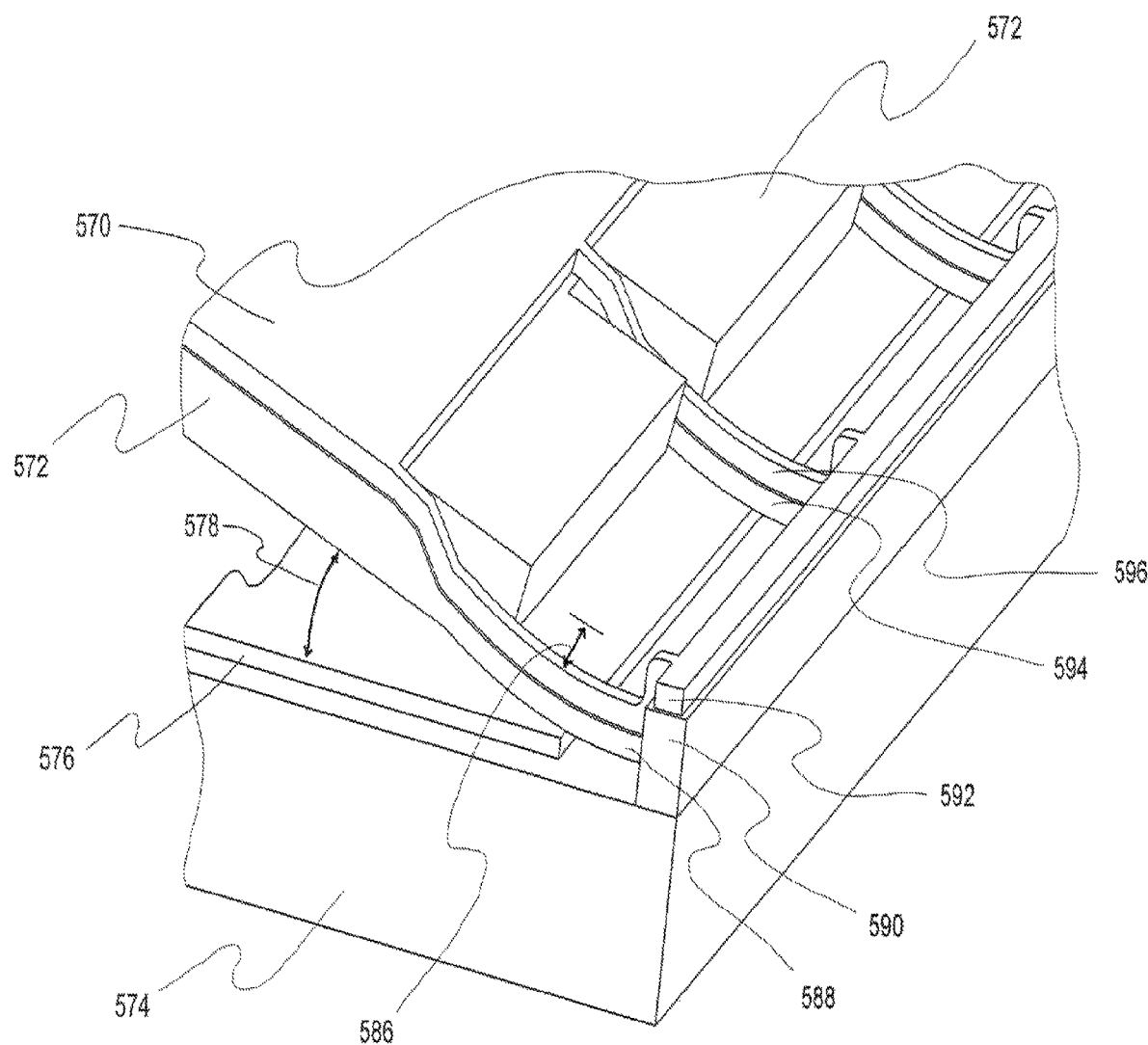

The hinge area of one possible configuration of a Single DOF VGOE is shown in FIG. 17. Given an electrically insulating substrate 574, a conductive layer 576 is deposited, patterned and is addressable via electronic circuitry. A sacrificial layer (not shown for clarity) and an additional insulating layer are then deposited and patterned to form the cantilever support bar 590 and insulating upper substrate 572. A controlled etch 586, is then applied to all hinge areas to adjust the overall thickness of 572 in the hinge area. This will have the effect of adjusting the spring rates of the final hinge layer areas represented by 588 and 594. Any number of hinges 580 may support a v-gap optical element. Providing a stress gradient across the thickness of insulating upper substrate 572 with various deposition techniques also allows a controlled etch 586, to move variable angle 578 to a chosen static position, when the device is inactive. Actuator layer, 570 may be deposited and patterned as before and may be electronically activated via address bar 592. An additional insulating layer (not shown) may be deposited over 570 followed by optical layer 571. Any number of actuator and optical layers may be fabricated on upper substrate 572, and may communicate with address bar 592 and external electrical circuits via areas of conduction represented by hinge area 596. Once all layers have been patterned, the sacrificial layer is removed, thereby freeing upper substrate 572, and allowing it to move to its static position.

Figure 18:
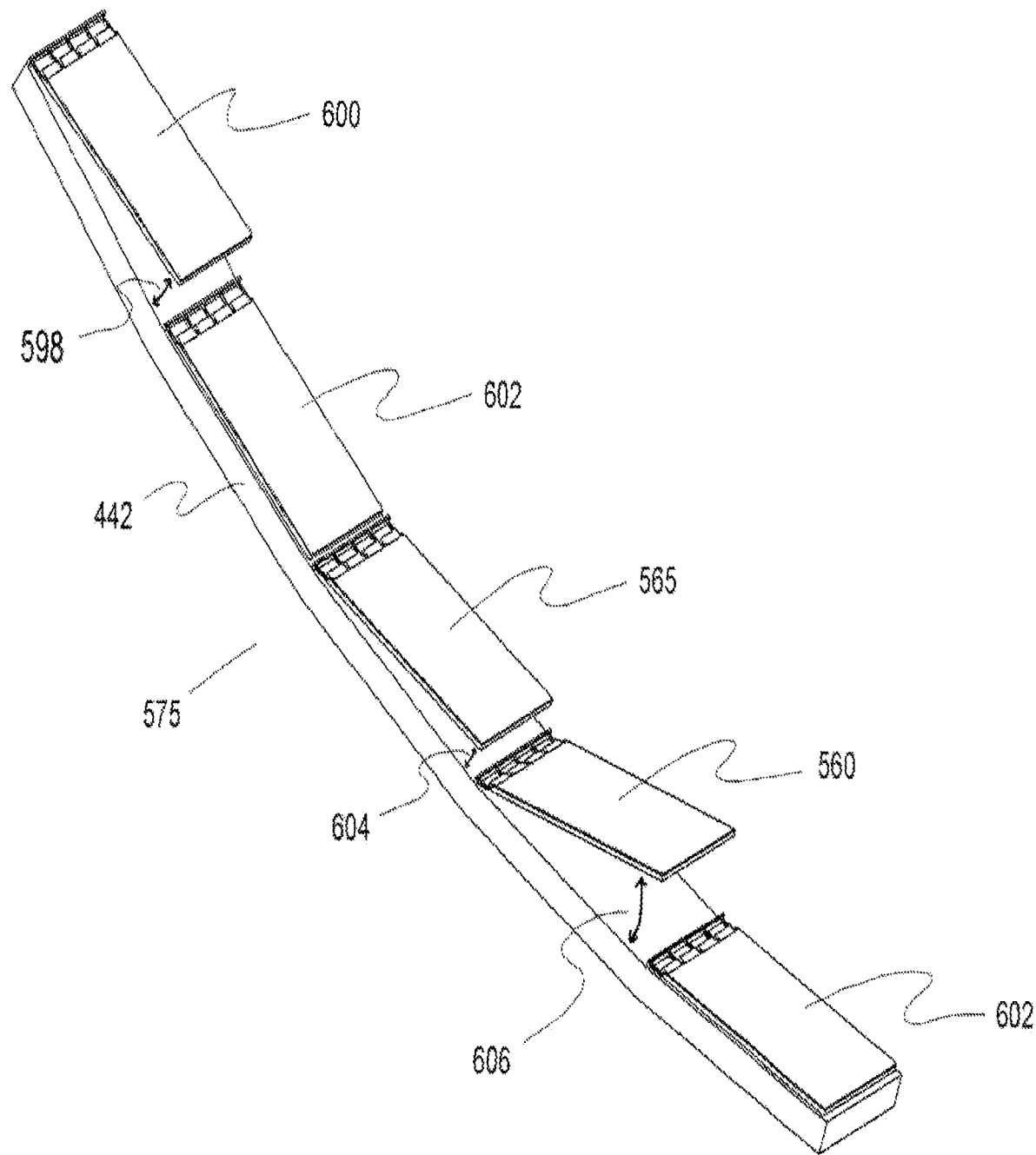

A small cross section of adaptive optics reflector array 575 is shown in FIG. 18. In this particular image, a small length of a single column of SDOF VGOEs is disposed on reflector body 442. In practice, this small array would continue in a linear fashion for perhaps hundreds or tens of thousands of elements. An entire adaptive reflector array 575 would then be composed of perhaps hundreds or tens of thousands of such columns placed side by side forming the approximately conic adaptive reflector array 575 and shown in isometric view 906 in FIG. 27.

Two SDOF VGOEs, 602 are shown in a fully closed state. Their optical surfaces are nearly parallel to the local surface of adaptive reflector array 575. SDOF VGOEs 600, 565 and 560 are shown driven to various precise angles 598, 604, and 606 respectively. In this way, the exact deflection angle of an impinging light ray will be controlled at each point on the surface of adaptive reflector array 575. With SDOF VGOEs, the rotation axis of any steerable optical element is normal to any vertical plane of cross section having point 510 in common (see FIG. 15). The family of normal vectors exiting the surface of each optical element may be overly constrained for some applications such that an image wave front cannot be properly represented. Thus, a multi DOF optical element would replace a single DOF element in this instance. A combination of single and multi DOF optical elements could be utilized on the same adaptive reflector array 575 substrate.

Figure 19:
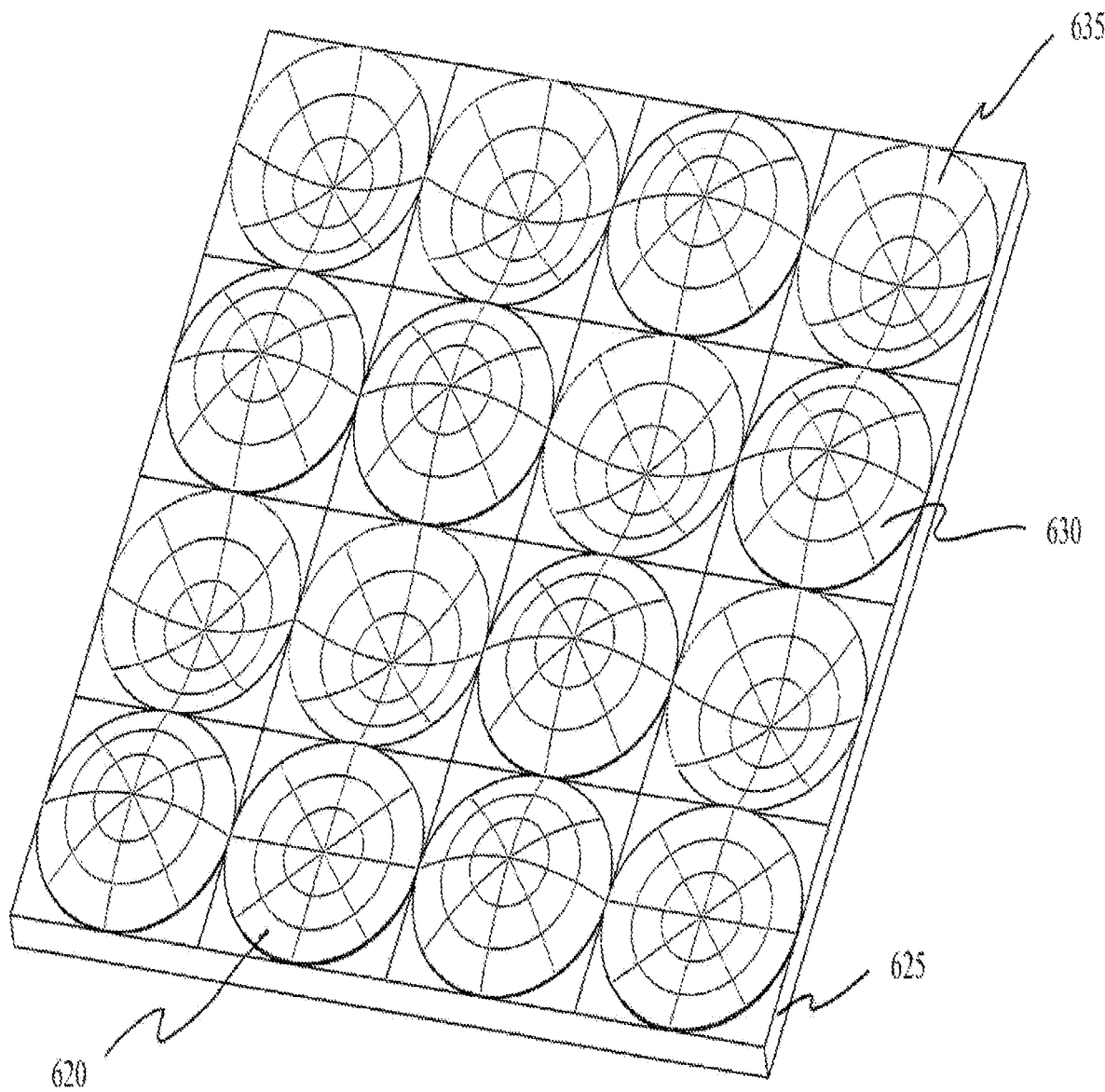

FIG. 19 shows a Variable Focus Optical Element Array 625, composed of an array of VFOEs 615, as described in FIGS. 4, 5 and 6. Each VFOE is connected to its neighbor in a semi-rigid manner such that the optical axis of each VFOE is somewhat aligned with respect to its neighbors. The optical surfaces of each VFOE can vary in curvature. In particular, VFOE 620 is in the inactive state producing a flat surface. In one possible example utilizing electrostatic actuation, VFOE 635 has opposite charges on its upper and lower surfaces, thus, the diaphragm surface assumes a concave shape. And VFOE 630 has been activated with like charges and its surface has assumed a convex shape.

Depending on the size of an individual VFOE, an array can shape individual beams to be less or more divergent. A VFOE array can also shape wave fronts and image planes for any predefined activation pattern across the array. The surface deformation at each point of the array can be dynamically focused for purposes of beam and image shaping. The overall curvature of VFOEA 625 can take the form of a conic reflector, a hemisphere, a convex reflector, a flat surface or any other predetermined shape.

Figure 20:
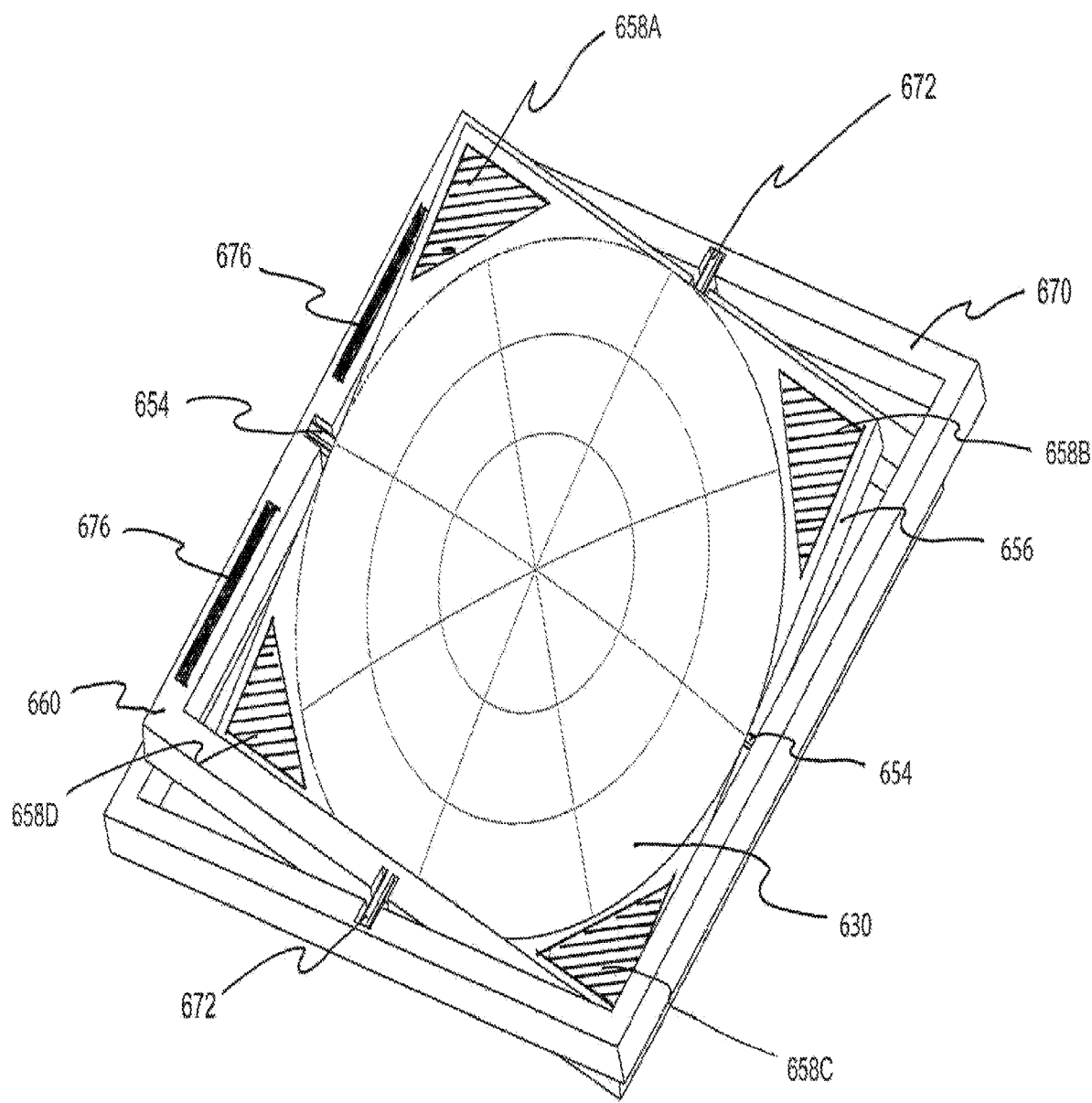

FIG. 20 shows a single steerable Variable Focus Optical Element in a convex state. In this particular embodiment, a VFOE 656, is similar in function to VFOE 615, and is configured to be suspended in a double gimbal frame configuration and constrained by two pairs of gimbaled torsion bearings, 654 and 672. Each bearing pair restrains vertical movements while permitting torsional movements with a single DOF. Conductive lines providing electrical communication to actuator pads 658A, 658B, 658C, 658D from the outside world, as well as electrical communication to optical surface 630, are in contact with, and pass over these gimbal bearings. In this example, the optical surface 630 has been activated to a convex state.

Actuator pads 658A, 658B, 658C, and 658D are arranged on the four surface corners of VFOE 656 to provide unbalanced actuation forces that can rotate VFOE 656 with two DOF about the rotation axis defined by gimbaled torsion bearings 654 and 672. If acting in pairs, actuator pads 658A and 658B can counter or enhance the rotation forces produced by 658C and 658D causing a pure rotation about an axis defined by gimbal bearing pair 654.

An outer gimbaled frame 660, holds the inner gimbaled VFOE 656, and permits rotation about the axis defined by gimbal bearing pair 654. A fixed outside frame 670, permits rotation of frame 660 about a second axis of rotation that is substantially orthogonal to the first, and defined by gimbal bearing pair 672. All electrical paths must travel over or upon this second set of gimbal bearings, 672. Actuator pads 676 (lower pads not shown due to obscuration) may provide electrostatic forces for rotating the inner gimbaled optical element 656 to a predetermined angle about gimbal bearing 672's axis of rotation.

As before, magnetic, thermal bimorph, thermal expansion, local optical heating, piezoelectric, shape memory deformation or a host of other forces could also be substituted to provide angular or linear displacement in a similar fashion.

Figure 21:
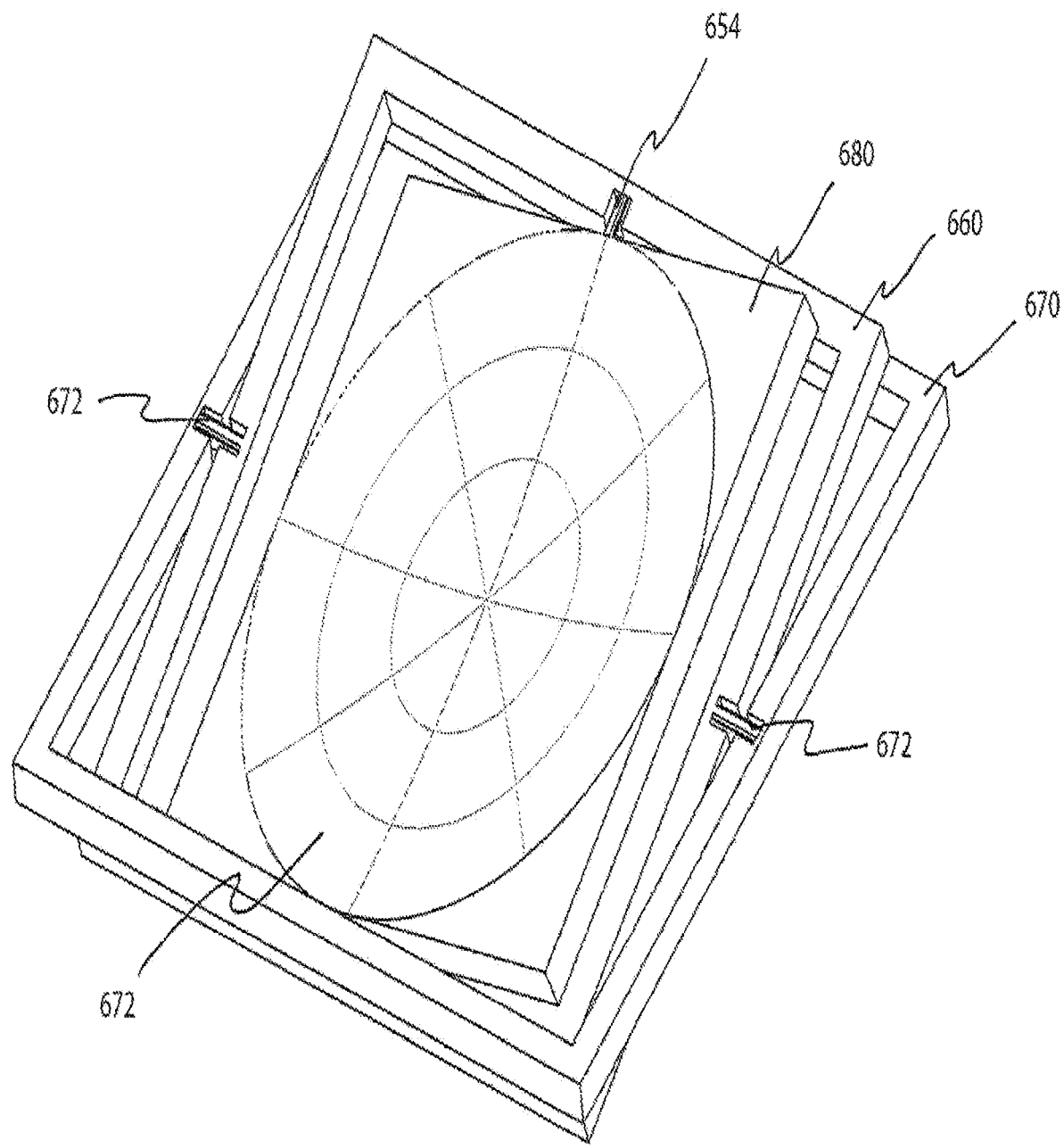

FIG. 21 shows a single steerable Variable Focus Optical Element in a concave state. Similar to the discussion of FIG. 20, but with VFOE 680 in a concave state. In this one example, VFOE 680 is torsionally constrained by a set of gimbaled torsion bearings 654 to outer gimbal frame 660 and outer gimbal frame 660 is torsionally constrained by a sets of gimbaled torsion bearings 672 to an externally fixed frame 670. Rotation forces, communication lines, actuator pads and alternative force producing methods are similar to the discussions of FIG. 20. It can be appreciated that in the most general sense, the method of gimbaled connections, the relative direction of their axes of rotation, and the external shape of the elements themselves can take many different physical forms.

It can be noted that a half ball micro lens or a vertical GRIN lens, or any other refracting lens could be fabricated or attached to a flat mirrored surface thereby providing steerable focusing power as well.

Figure 22:
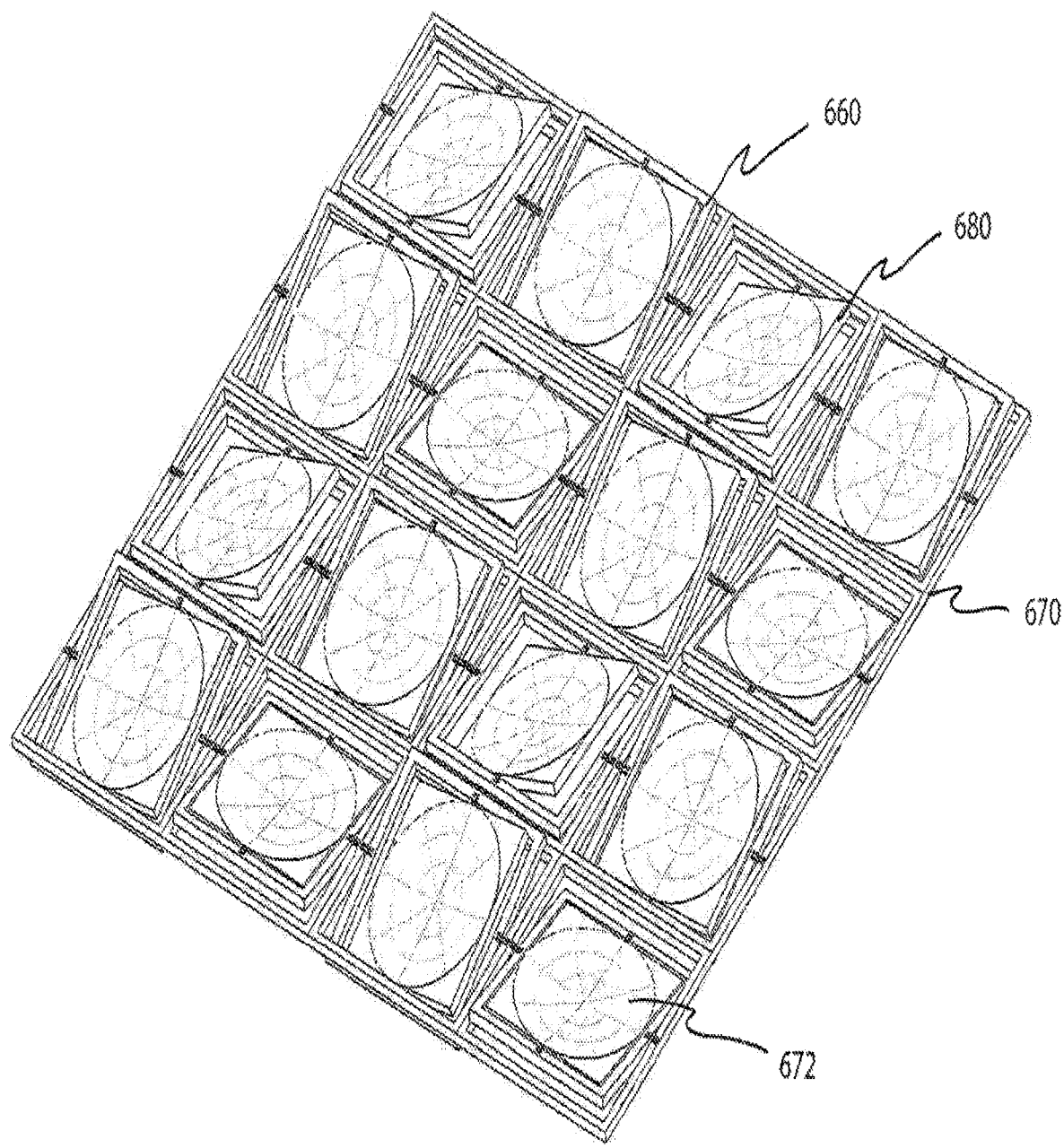

FIG. 22 shows an array of steerable Variable Focus Optical Elements in a concave state. Individual beam steering elements 680, can take the form of a dynamic VFOE, or can be statically defined by the fixed curvature of each optical surface. Individual elements can take any curvature. The array 670, can be configured for controlled single DOF motion, two DOF motions, or a combination of the two. The outer fixed frame portion of array 670 will generally be formed into a conic reflector, but can take any general shape.

A concave point reflector profile is advantageous for the reflection of small diameter laser beams, as unavoidable divergence due to diffraction is inversely proportional to beam diameter and must be maintained with positive focusing elements, if a small spot size is desired at a close distance. The average size of a photoreceptor is approximately 6 microns. And the smallest resolvable angle for the human eye with 20/20 vision is approximately 60 seconds of arc. Therefore, if 20/20 resolving power is the goal, then for example, a 2.5 mm diameter beam must be must be collimated to approximately one degree of divergence to form a 5 micron spot on the retina with a crystalline lens 408 focal length of approximately 17.1 mm. A point source distance of 6 inches from the cornea represents a beam divergence of approximately 1 degree.

Figure 23:
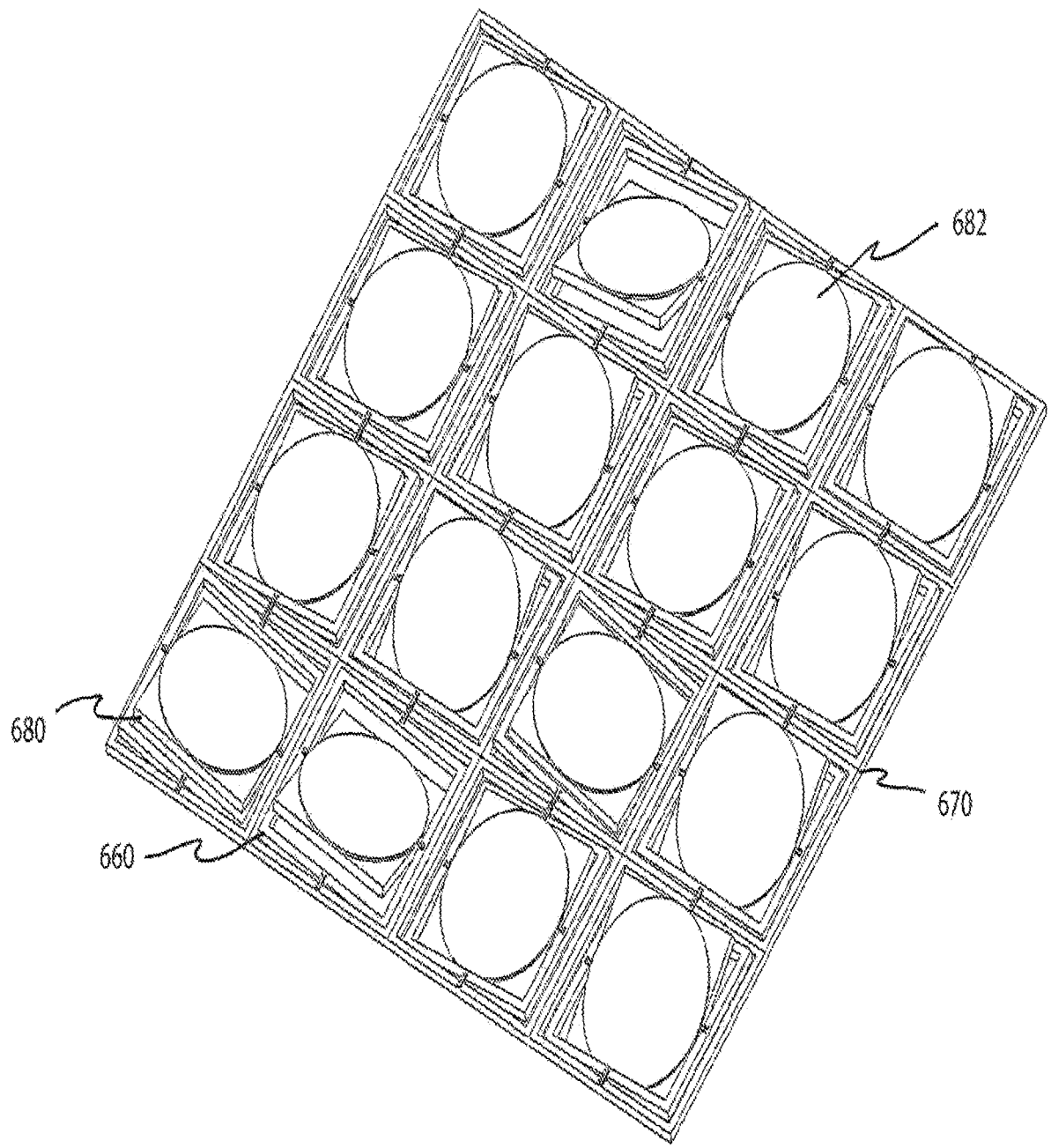

Shown in FIG. 23 is a double gimbaled, flat optical array. Other than the central optical element, all features and operations are similar to the arrays previously discussed. In one embodiment, the optical surface, 682 of all beam steering elements 680 are in a flat state. This can be achieved by the dynamic control of a VFOE or by the use of a statically defined flat surface. As before, substrate 670 is fixed with respect to outer gimbaled frame 660. A single DOF flat mirror state is quite useful in a reflector array designed for dynamic focusing of portions of the total reflector surface as described in FIG. 15. Of course, beam steering elements 680 can be of any external shape including rectangular or square.

As before the optical surface 682, can also take the form of a simple micromirror, a dynamic VFOE, a multidielectric stack, a metamaterial, a static or dynamically controlled optical grating array, a static convex or concave optical element, or any other optical element that can transmit, absorb, polarize, upconvert, downconvert, lase, emit, refract or reflect electromagnetic radiation in any way. It must also be noted that the method of action should not be limited to electrostatic forces only. Magnetic, thermal bimorph, thermal expansion, local optical heating, piezoelectric, shape memory deformation or a host of other forces could also be substituted to provide angular or linear displacement in a similar fashion.

Figure 24:
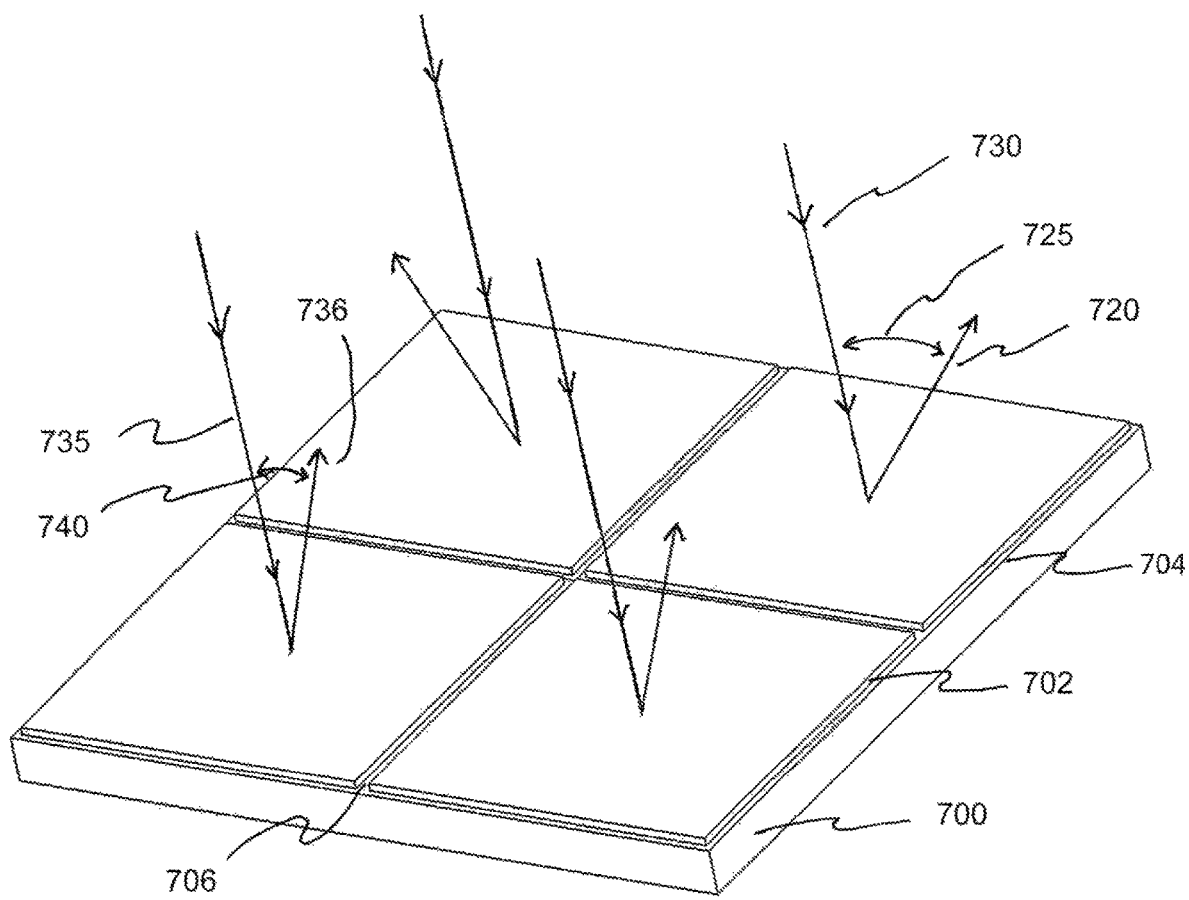

FIG. 24 shows and array of metamaterial reflectors. Metamaterials have shown a promising potential for having the ability to vary n, a measure of their refractive coefficients. In the right configuration, an incident beam 735 can be electronically deflected by an angle 740 at one potential while incident beam 730 can be electronically deflected by an angle 725 at a different potential. The simple configuration shown, consists of a deliberately engineered thin film nano structure that can be made to alter the index of refraction at will. Small pads of index changing metamaterial, 702 are fabricated on substrate 700 and are isolated from one another by trenches 706. Each metamaterial pad 702 is controlled by individually addressable control plates, 704 positioned beneath each pad 702 and upon substrate 700.

Figure 25:
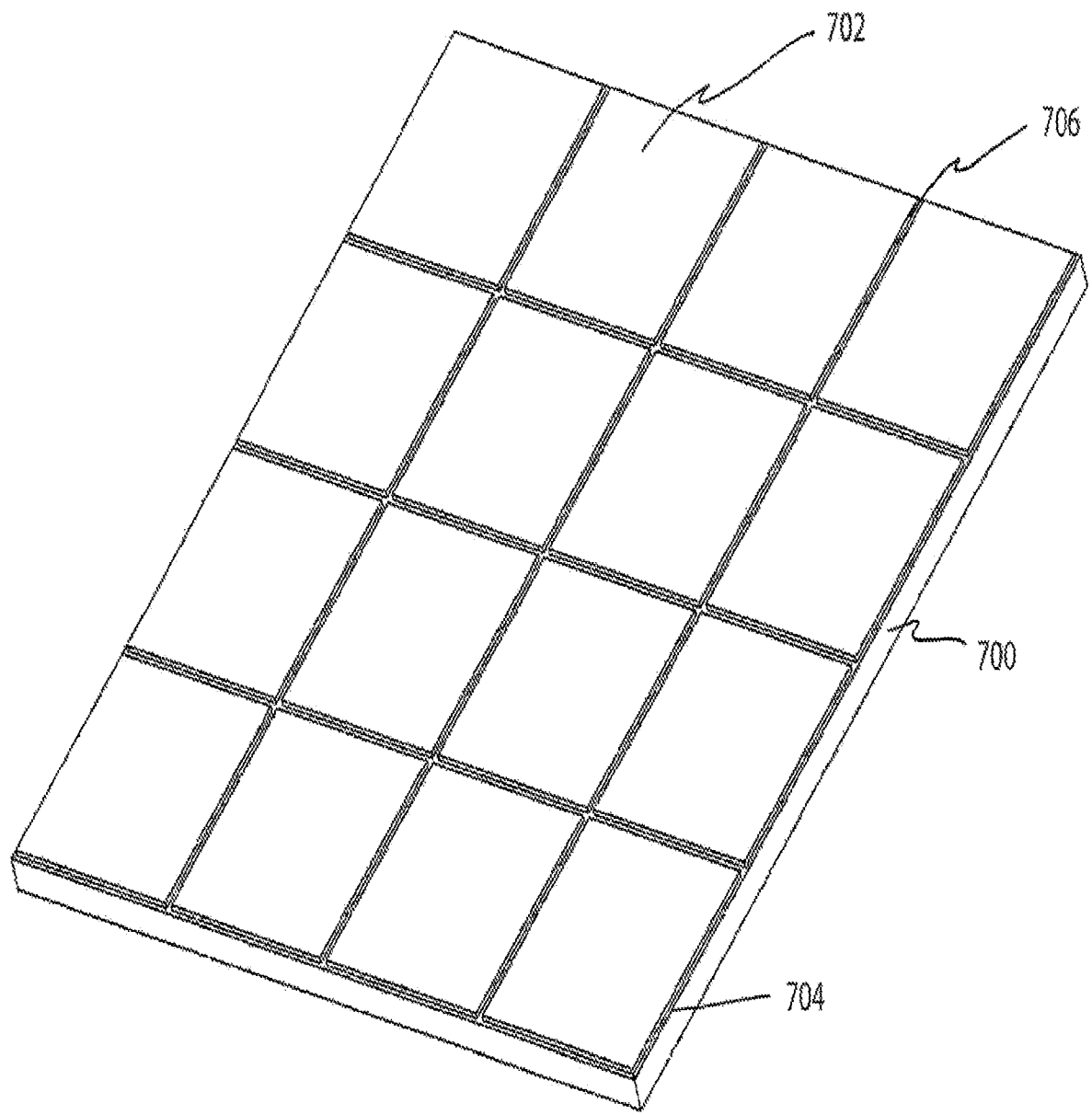

FIG. 25 shows a larger array of metamaterial beam steering plates 702 disposed on substrate 700 and lying directly over control plates 704. The array can be made sufficiently large to accommodate a large visual field at high acuity. The upper limit of beam deflecting elements could be larger than the total number of photoreceptors in the human eye, or 15 million. Substrate 700 may take any 3D curved form, such as a conic, to provide the necessary beam forming properties as described in the FIG. 15 discussion and represented by adaptive reflector array 575.

Figure 26:
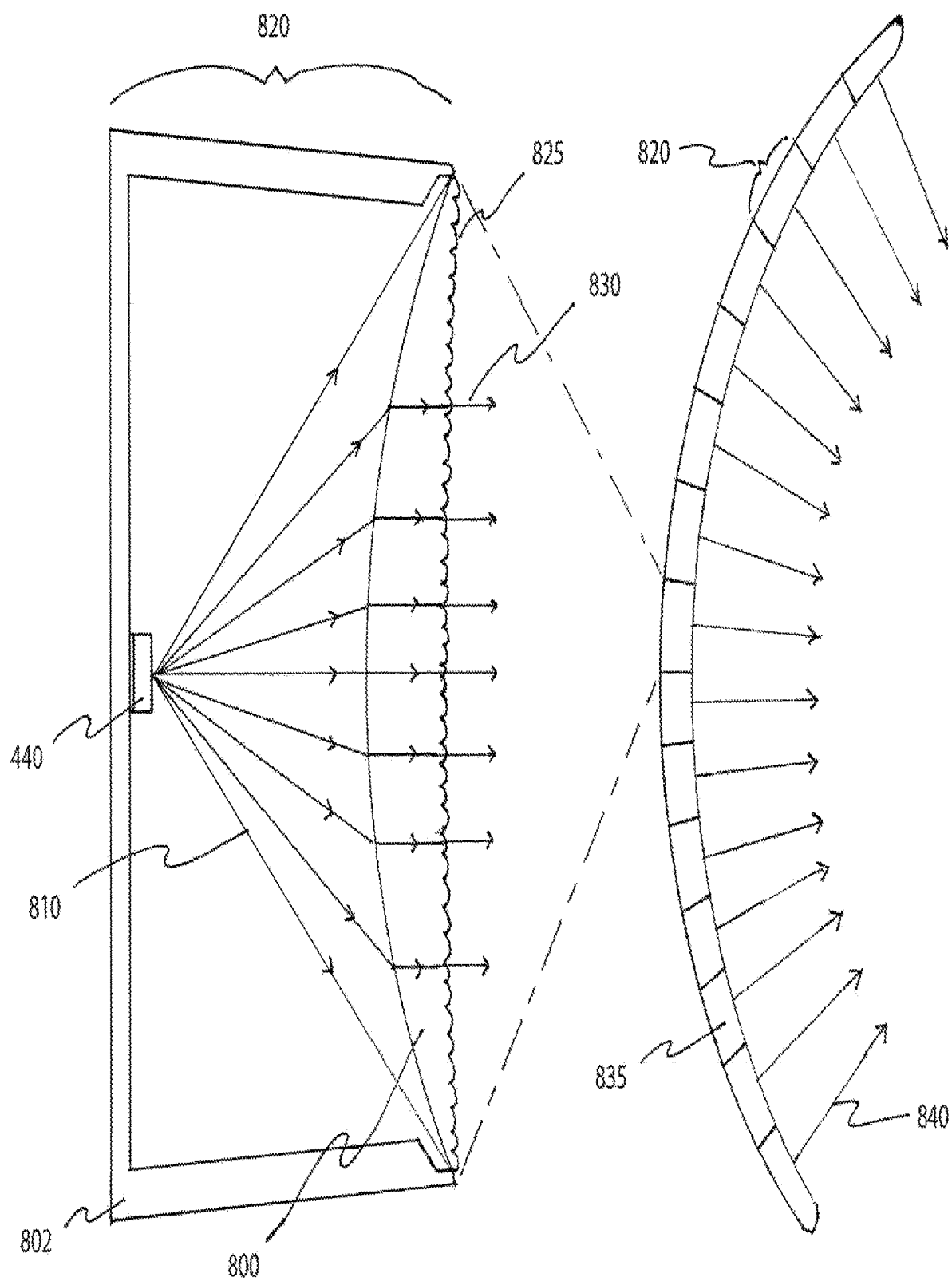

A Micro Scanner Direct Projection Optical Element 820, is shown in FIG. 26. It consists of a scanning projector 440, a compound lens 800, with a corrective first surface nearest scanning projector 440 and a micro lens covered second surface nearest the eye 460. The MSDPOE 820 is contained within an isolation container 802, that provides support for elements 440 and 800, and optical isolation from neighboring MSDPOEs. Electrical and optical signals are conveyed to each MSDPOE via the back surface of 802. As with the Adaptive Optics Reflector Array 575 discussed in FIG. 18, a small column of MSDPDs, 835, is shown in FIG. 26. By combining a sufficient number of projector columns side by side, a full vertical and horizontal field of view may be produced.

The function of the MSDPOE array is as follows. Precisely calculated divergently scanned beams of light 810, are emitted by scanning projector 440. These rays strike the back of lens 800 and are made nearly parallel after passing through the first surface. Beam divergence is then refined by the micro lens array, 825 on the front side of lens 800, such that a small focus spot may be achieved on the retina. Each MSDPOE is rigidly affixed to its neighbor and produces projected rays 840, that are canted in the proper direction to intercept the cornea, thereby producing a properly immersive scan directly on the retina. It may be noted, that beam 840 is approximately normal to the exit surface of lens 800 and may not depart at the proper angle for all simulated visual field conditions. To correct for this situation, one might employ the array of steerable flat optical elements 682 shown in FIG. 23. In this 2DOF implementation, one would simply replace the flat reflectors supported in the double gimbal frames with micro lenses. A general exit beam direction could then be achieved by introducing this beam steering array in place of the micro lens array 825. It can be appreciated that the lens 800 and container 802 could form a scanning optical projector with any combination of refractive or reflective elements of any shape. For instance, scanning projector 440 could be placed on the back surface of 800 and directed towards a reflective surface defined by the inner wall of 802. Said reflective wall of 802 might take the form of a near-parabolic reflecting surface 422 of FIG. 10. Rays 810 would then reflect off of this surface and pass through lens 800 as before. This is similar to the larger projector configuration of FIG. 12. Finally, by combining the function of the design found in FIG. 12, with the refractive steerability described above, one could provide a compact, micro scanner direct projection element 820 with a near ideal exit angle for any beam 840.

Figure 27:
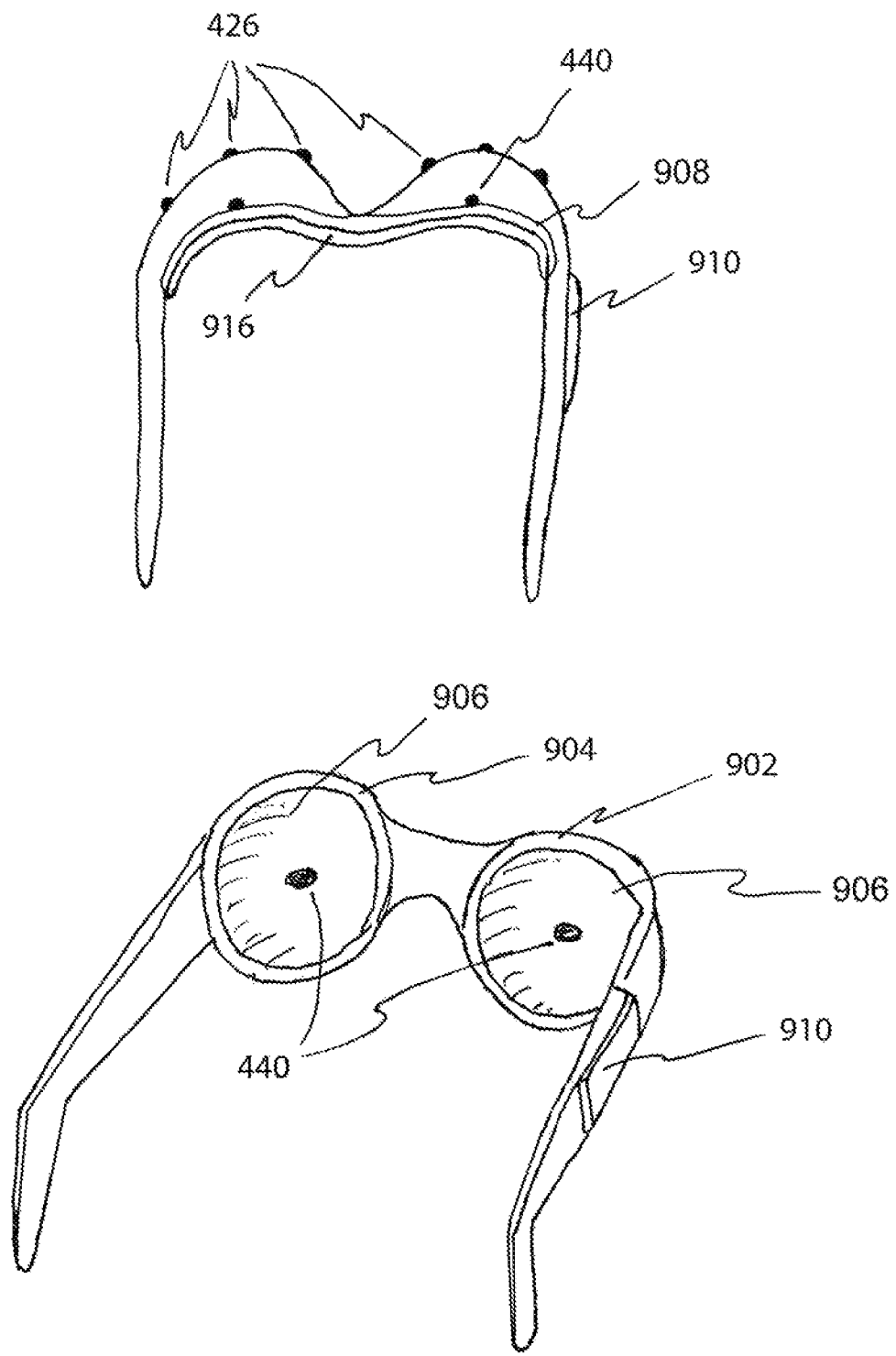

FIG. 27 shows a top view of the system integrating glasses 900 in the upper area and an isometric view of the glasses in the bottom part of the figure. The integrated system consists of a computer, power, and communications module, 910 that may combine all three functions into one. However, it is likely that a remote computational device, perhaps cloud based, would carry most of the load considering the current state of microcomputers, while the communications functions could adequately be handled in this volume. It can be appreciated that the computer and communications functions could all be located remotely from the glasses frame. A power source could be supported, but more likely, this too would be accessed off frame via a wire or with some other remote power delivery method. The scanning projectors 440 are shown for each of the left and right eyes. The scanned beams reflect off any variety of reflectors 906, described herein. A comfortable, light isolation foam gasket 916, would be replaceable and custom fit for each individual, incorporating a breathable, light baffling design. If needed, external eye tracking cameras placed on an angular ring 902, could be provided to view the pupil in the usual way. The eye tracking cameras could also be placed on each reflector surface 906 if small enough to not be intrusive. External cameras, 426 are shown and if properly distributed on the outer surface and of high enough resolution, could provide video input to the wearer that would emulate what one would see if not wearing the glasses. This view could also be combined with purely synthetic images to give a sense of augmented reality. Corrective lens 908 also provides support for the scanning projectors 440. Finally, an external view of one's eyes through each lens, as perceived by a passerby could be achieved by acquiring an image of the wearers eyes with an inward facing mini camera and projecting it on the external surface of 920 via a liquid crystal, LED or OLED, or any other display. To complete the full immersion effect, one or more speakers 905 in the form of earbuds, for example, could be incorporated into system integrating glasses 900.

I claim an immersive optical projection device comprising:

1. A method of projecting light from a projector coupled to a frame supporting the projector, the method comprising:
   emitting a light beam by an optical element of the projector, wherein:
      the projector is coupled to a projector support; and
      the projector support is coupled to the frame;
   modifying the light beam by the projector and the modified beam proceeds towards a reflector, wherein:
      the reflector is coupled to the frame;
      the reflector includes a reflective surface;
      the reflective surface includes a first focal point and a second focal point; and
      the projector is located near the first focal point of the reflective surface; and
   reflecting the beam off the reflective surface of the reflector to project the light towards the second focal point of the reflective surface.

2. The method of claim 1 wherein the frame comprises an eyeglass frame configured for a user to wear and the projector is oriented to at least project the beam of light into an eye of the user wearing the eyeglass frame.

3. The method of claim 2 wherein the projector is configured such that the beam of light is projected both towards and away from the eye of the user wearing the eyeglass frame.

4. The method of claim 1 wherein the reflector comprises a partial mirror.

5. The method of claim 1 further comprising a corrective lens coupled to the frame.

6. The method of claim 1 wherein the reflective surface comprises a partial mirror.

7. The method of claim 1 further comprising:
   dynamically controlling a vergence of the beam of light impinging on the reflector; and
   steering the reflector with at least one degree of freedom.

8. The method of claim 1 wherein the projector is a scanning projector comprising a multi-degree of freedom beam steering device.

9. The method of claim 1 wherein the beam of light is modified by one or more of (i) changing one or more directions of the beam of light, (ii) changing an intensity of the beam of light, (iii) changing a color of the beam of light, (iv) changing a polarization of the beam of light, and (v) changing a divergence of the beam of light.

10. The method of claim 1 wherein the frame includes attachments comprising:
    at least one power source;
    at least one communications module; and
    at least one speaker.

11. The method of claim 1 further comprising:
    recording video from at least one external camera affixed to distal surface of the reflector; and
    sensing motion of the frame using at least one motion sensor affixed to the frame.

12. A method of immersive imaging by an imaging system, the method comprising:
    directing a light beam emanating from a first scanner towards a second scanner, wherein:
       the first single axis scanner is coupled to a frame and includes a first scanning axis;
       at least one optical element is coupled to the frame, wherein the light beam impinges on and at least partially reflects off the at least one optical element;
       the second scanner that includes a second scanning axis, wherein:
          the second scanner is coupled to the frame,
          the first scanner is positioned in front of, on, or behind the at least one optical element with respect to a direction of gaze of an eye of a user wearing the frame; and
          a rotation axis of the first scanning axis is substantially orthogonal to a rotation axis of the second scanner.

13. The method of claim 12 wherein the at least one optical element comprises an array of variable focus optical elements, the at least one optical element is at least partially reflective, and the at least one optical element imposes negative optical power, positive optical power, variable optical power, or zero optical power on the beam of light impinging on the optical element.

14. The method of claim 12 wherein the at least one optical element comprises a partial mirror.

15. The method of claim 12 wherein reflectivity of the at least one optical element is electronically controllable.

16. A method of immersive imaging by an imaging system, the method comprising:
    directing a beam of light from at least one beam source towards a dual axis reflective scanner;
    reflecting the beam of light off the dual axis reflective scanner towards at least one optical element; and
    redirecting by the at least one optical element the reflected beam of light into an eye of a user of the imaging system;
    wherein the imaging system includes:
    a frame;
    the at least one optical element is coupled to the frame;
    the at least one beam source is coupled to the frame and the at least one beam source is positioned in front of, on, or behind the at least one optical element with respect to the user's direction of gaze; and
    the dual axis reflective scanner is coupled to said frame.

17. The method of claim 16, wherein the at least one optical element comprises an array of variable focus optical elements and the at least one optical element is at least partially reflective and the at least one optical element imposes negative optical power, positive optical power, variable optical power, or zero optical power on an impinging beam of light.

18. The method of claim 16 wherein the at least one optical element comprises a partial mirror and has variable reflectivity.

19. The method of claim 16 wherein reflectivity of said at least one optical element is electronically controllable and has variable photo density.

20. The method of claim 16 further comprising:
    modifying the beam of light with an optical beam modifier located between the optical element and the projector, wherein modifying the beam of light comprises:
    dynamically controlling a vergence of the beam of light impinging on the reflector; and steering the reflector with at least one degree of freedom.

* * * * *